_US010263965B2_

United States Patent
Mosko et al.

(10) Patent No.: US 10,263,965 B2
(45) Date of Patent: Apr. 16, 2019

(54) ENCRYPTED CCNX

(71) Applicant: CISCO TECHNOLOGY, INC., San Jose, CA (US)

(72) Inventors: Marc E. Mosko, Santa Cruz, CA (US); Christopher A. Wood, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 140 days.

(21) Appl. No.: 14/885,904

(22) Filed: Oct. 16, 2015

(65) Prior Publication Data

US 2017/0111330 A1 Apr. 20, 2017

(51) Int. Cl.
*H04L 29/06* (2006.01)
*H04L 9/00* (2006.01)
(Continued)

(52) U.S. Cl.
CPC ............ *H04L 63/0435* (2013.01); *H04L 9/00* (2013.01); *H04L 9/0618* (2013.01);
(Continued)

(58) Field of Classification Search
CPC . H04L 63/0435; H04L 9/0618; H04L 9/0631; H04L 9/302
See application file for complete search history.

(56) References Cited

U.S. PATENT DOCUMENTS 817,441 A 4/1906 Niesz
4,309,569 A 1/1982 Merkle
(Continued)

FOREIGN PATENT DOCUMENTS

CN 103873371 6/2014
DE 1720277 A1 6/1967
(Continued)

OTHER PUBLICATIONS

Liu, Hang—A TLV-Structured Data Naming Scheme for Content Oriented Networking. Published in: Communications (ICC), 2012 IEEE International Conference on Jun. 10-15, 2012. Date Added to IEEE Xplore: Nov. 29, 2012.*
(Continued)

*Primary Examiner* — Mahfuzur Rahman
*Assistant Examiner* — Richard W Cruz-Franqui

(57) ABSTRACT

One embodiment provides a system that facilitates selective encryption of bit groups of a message. During operation, the system determines, by a content requesting device or content producing device, a message that includes a plurality of bit groups, each corresponding to a type, a length, and a set of values, wherein one or more bit groups are marked for encryption, and wherein the message indicates a name that is a hierarchically structured variable-length identifier comprising contiguous name components ordered from a most general level to a most specific level. The system computes a plurality of cipher blocks for the message based on an authenticated encryption protocol. The system encrypts the one or more bit groups marked for encryption based on one or more symmetric keys, wherein the marked bit groups include one or more name components. Subsequently, the system indicates the encrypted bit groups as encrypted.

24 Claims, 11 Drawing Sheets

(51) Int. Cl.
  *H04L 9/14* (2006.01)
  *H04L 9/32* (2006.01)
  *H04L 9/06* (2006.01)
  *H04L 9/30* (2006.01)

(52) U.S. Cl.
  CPC .............. *H04L 9/0631* (2013.01); *H04L 9/14* (2013.01); *H04L 9/302* (2013.01); *H04L 9/3242* (2013.01); *H04L 9/3247* (2013.01); *H04L 63/061* (2013.01); *H04L 63/123* (2013.01)

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,440,635 A * | 8/1995 | Bellovin ............... H04L 9/0844 380/285 |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,021,464 A | 2/2000 | Yao |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,957,228 B1 | 3/2003 | Horvitz |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanVanvalkenburg |
| 6,834,272 B1 | 12/2004 | Naor |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,181,620 B1 * | 2/2007 | Hur ........................ H04L 9/083 713/168 |
| 7,206,860 B2 | 4/2007 | Murakami |
| 7,206,861 B1 | 4/2007 | Callon |
| 7,210,326 B2 | 5/2007 | Kawamoto |
| 7,233,948 B1 | 6/2007 | Shamoon |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,535,926 B1 | 5/2009 | Deshpande |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,331 B2 | 8/2012 | Shanmugavelayutham |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,375,420 B2 | 2/2013 | Farrell |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |

(56) References Cited

U.S. PATENT DOCUMENTS

| | | | |
|---|---|---|---|
| 8,762,570 B2 | 6/2014 | Qian | |
| 8,762,707 B2 | 6/2014 | Killian | |
| 8,767,627 B2 | 7/2014 | Ezure | |
| 8,817,594 B2 | 8/2014 | Gero | |
| 8,826,381 B2 | 9/2014 | Kim | |
| 8,832,302 B1 | 9/2014 | Bradford | |
| 8,836,536 B2 | 9/2014 | Marwah | |
| 8,861,356 B2 | 10/2014 | Kozat | |
| 8,862,774 B2 | 10/2014 | Vasseur | |
| 8,868,779 B2 | 10/2014 | ONeill | |
| 8,874,842 B1 | 10/2014 | Kimmel | |
| 8,880,682 B2 | 11/2014 | Bishop | |
| 8,903,756 B2 | 12/2014 | Zhao | |
| 8,923,293 B2 | 12/2014 | Jacobson | |
| 8,934,496 B2 | 1/2015 | Vasseur | |
| 8,937,865 B1 | 1/2015 | Kumar | |
| 8,972,969 B2 | 3/2015 | Gaither | |
| 8,977,596 B2 | 3/2015 | Montulli | |
| 9,002,921 B2 | 4/2015 | Westphal | |
| 9,015,468 B2* | 4/2015 | Wang | H04L 63/0428 |
| | | | 713/150 |
| 9,032,095 B1 | 5/2015 | Traina | |
| 9,071,498 B2 | 6/2015 | Beser | |
| 9,112,895 B1 | 8/2015 | Lin | |
| 9,137,152 B2 | 9/2015 | Xie | |
| 9,253,087 B2 | 2/2016 | Zhang | |
| 9,270,598 B1 | 2/2016 | Oran | |
| 9,280,610 B2 | 3/2016 | Gruber | |
| 9,401,899 B2* | 7/2016 | Wang | H04L 63/0428 |
| 9,590,887 B2* | 3/2017 | Mahadevan | H04L 45/026 |
| 9,596,323 B2* | 3/2017 | Luby | H04L 67/02 |
| 2002/0002680 A1 | 1/2002 | Carbajal | |
| 2002/0010795 A1 | 1/2002 | Brown | |
| 2002/0038296 A1 | 3/2002 | Margolus | |
| 2002/0048269 A1 | 4/2002 | Hong | |
| 2002/0054593 A1 | 5/2002 | Morohashi | |
| 2002/0077988 A1 | 6/2002 | Sasaki | |
| 2002/0078066 A1 | 6/2002 | Robinson | |
| 2002/0138551 A1 | 9/2002 | Erickson | |
| 2002/0152305 A1 | 10/2002 | Jackson | |
| 2002/0176404 A1 | 11/2002 | Girard | |
| 2002/0188605 A1 | 12/2002 | Adya | |
| 2002/0199014 A1 | 12/2002 | Yang | |
| 2003/0004621 A1 | 1/2003 | Bousquet | |
| 2003/0009365 A1 | 1/2003 | Tynan | |
| 2003/0033394 A1 | 2/2003 | Stine | |
| 2003/0046396 A1 | 3/2003 | Richter | |
| 2003/0046421 A1 | 3/2003 | Horvitz et al. | |
| 2003/0046437 A1 | 3/2003 | Eytchison | |
| 2003/0048793 A1 | 3/2003 | Pochon | |
| 2003/0051100 A1 | 3/2003 | Patel | |
| 2003/0061384 A1 | 3/2003 | Nakatani | |
| 2003/0074472 A1 | 4/2003 | Lucco | |
| 2003/0088696 A1 | 5/2003 | McCanne | |
| 2003/0097447 A1 | 5/2003 | Johnston | |
| 2003/0099237 A1 | 5/2003 | Mitra | |
| 2003/0140257 A1 | 7/2003 | Peterka | |
| 2003/0229892 A1 | 12/2003 | Sardera | |
| 2004/0024879 A1 | 2/2004 | Dingman | |
| 2004/0030602 A1 | 2/2004 | Rosenquist | |
| 2004/0039906 A1* | 2/2004 | Oka | H04L 63/065 |
| | | | 713/156 |
| 2004/0064737 A1 | 4/2004 | Milliken | |
| 2004/0071140 A1 | 4/2004 | Jason | |
| 2004/0073617 A1 | 4/2004 | Milliken | |
| 2004/0073715 A1 | 4/2004 | Folkes | |
| 2004/0139230 A1 | 7/2004 | Kim | |
| 2004/0196783 A1 | 10/2004 | Shinomiya | |
| 2004/0218548 A1 | 11/2004 | Kennedy | |
| 2004/0221047 A1 | 11/2004 | Grover | |
| 2004/0225627 A1 | 11/2004 | Botros | |
| 2004/0233916 A1 | 11/2004 | Takeuchi | |
| 2004/0246902 A1 | 12/2004 | Weinstein | |
| 2004/0252683 A1 | 12/2004 | Kennedy | |
| 2004/0267902 A1 | 12/2004 | Yang | |
| 2005/0003832 A1 | 1/2005 | Osafune | |
| 2005/0013440 A1* | 1/2005 | Akiyama | H04H 60/16 |
| | | | 380/277 |
| 2005/0028156 A1 | 2/2005 | Hammond | |
| 2005/0043060 A1 | 2/2005 | Brandenberg | |
| 2005/0050211 A1 | 3/2005 | Kaul | |
| 2005/0066121 A1 | 3/2005 | Keeler | |
| 2005/0074001 A1 | 4/2005 | Mattes | |
| 2005/0132207 A1 | 6/2005 | Mourad | |
| 2005/0149508 A1 | 7/2005 | Deshpande | |
| 2005/0159823 A1 | 7/2005 | Hayes | |
| 2005/0198351 A1 | 9/2005 | Nog | |
| 2005/0249196 A1 | 11/2005 | Ansari | |
| 2005/0259637 A1 | 11/2005 | Chu | |
| 2005/0262217 A1 | 11/2005 | Nonaka | |
| 2005/0281288 A1 | 12/2005 | Banerjee | |
| 2005/0286535 A1 | 12/2005 | Shrum | |
| 2005/0289222 A1 | 12/2005 | Sahim | |
| 2006/0010249 A1 | 1/2006 | Sabesan | |
| 2006/0029102 A1 | 2/2006 | Abe | |
| 2006/0039379 A1 | 2/2006 | Abe | |
| 2006/0051055 A1 | 3/2006 | Ohkawa | |
| 2006/0072523 A1 | 4/2006 | Richardson | |
| 2006/0099973 A1 | 5/2006 | Nair | |
| 2006/0129514 A1 | 6/2006 | Watanabe | |
| 2006/0129811 A1* | 6/2006 | Fiske | H04L 9/0631 |
| | | | 713/167 |
| 2006/0133343 A1 | 6/2006 | Huang | |
| 2006/0146686 A1 | 7/2006 | Kim | |
| 2006/0173831 A1 | 8/2006 | Basso | |
| 2006/0193295 A1 | 8/2006 | White | |
| 2006/0203804 A1 | 9/2006 | Whitmore | |
| 2006/0206445 A1 | 9/2006 | Andreoli | |
| 2006/0215684 A1 | 9/2006 | Capone | |
| 2006/0223504 A1 | 10/2006 | Ishak | |
| 2006/0242155 A1 | 10/2006 | Moore | |
| 2006/0256767 A1 | 11/2006 | Suzuki | |
| 2006/0268792 A1 | 11/2006 | Belcea | |
| 2006/0288237 A1 | 12/2006 | Goodwill | |
| 2007/0019619 A1 | 1/2007 | Foster | |
| 2007/0033397 A1* | 2/2007 | Phillips, II | H04L 63/045 |
| | | | 713/168 |
| 2007/0073888 A1 | 3/2007 | Madhok | |
| 2007/0094265 A1 | 4/2007 | Korkus | |
| 2007/0101123 A1* | 5/2007 | Kollmyer | H04L 29/06027 |
| | | | 713/154 |
| 2007/0112880 A1 | 5/2007 | Yang | |
| 2007/0124412 A1 | 5/2007 | Narayanaswami | |
| 2007/0127457 A1 | 6/2007 | Mirtorabi | |
| 2007/0156998 A1 | 7/2007 | Gorobets | |
| 2007/0160062 A1 | 7/2007 | Morishita | |
| 2007/0162394 A1 | 7/2007 | Zager | |
| 2007/0171828 A1 | 7/2007 | Dalal | |
| 2007/0189284 A1 | 8/2007 | Kecskemeti | |
| 2007/0195765 A1 | 8/2007 | Heissenbuttel | |
| 2007/0198838 A1* | 8/2007 | Nonaka | G06F 21/10 |
| | | | 713/176 |
| 2007/0204011 A1 | 8/2007 | Shaver | |
| 2007/0209067 A1 | 9/2007 | Fogel | |
| 2007/0239892 A1 | 10/2007 | Ott | |
| 2007/0240207 A1 | 10/2007 | Belakhdar | |
| 2007/0245034 A1 | 10/2007 | Retana | |
| 2007/0253418 A1 | 11/2007 | Shiri | |
| 2007/0255677 A1 | 11/2007 | Alexander | |
| 2007/0255699 A1 | 11/2007 | Sreenivas | |
| 2007/0255781 A1 | 11/2007 | Li | |
| 2007/0274504 A1 | 11/2007 | Maes | |
| 2007/0275701 A1 | 11/2007 | Jonker | |
| 2007/0276907 A1 | 11/2007 | Maes | |
| 2007/0283158 A1 | 12/2007 | Danseglio | |
| 2007/0294187 A1 | 12/2007 | Scherrer | |
| 2008/0005056 A1 | 1/2008 | Stelzig | |
| 2008/0005223 A1 | 1/2008 | Flake | |
| 2008/0005262 A1* | 1/2008 | Wurzburg | G06F 13/4022 |
| | | | 709/217 |
| 2008/0010366 A1 | 1/2008 | Duggan | |
| 2008/0037420 A1 | 2/2008 | Tang | |
| 2008/0043989 A1 | 2/2008 | Furutono | |
| 2008/0046340 A1 | 2/2008 | Brown | |

(56) References Cited

U.S. PATENT DOCUMENTS

| | | |
|---|---|---|
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0122326 A1* | 5/2010 | Bisbee .................. G06F 21/33 726/5 |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |

(56) References Cited

U.S. PATENT DOCUMENTS

| | | | |
|---|---|---|---|
| 2012/0039469 A1* | 2/2012 | Mueller | G06Q 20/12 380/252 |
| 2012/0045064 A1 | 2/2012 | Rembarz | |
| 2012/0047361 A1 | 2/2012 | Erdmann | |
| 2012/0066727 A1 | 3/2012 | Nozoe | |
| 2012/0079056 A1 | 3/2012 | Turanyi et al. | |
| 2012/0079281 A1* | 3/2012 | Lowenstein | G06F 21/602 713/189 |
| 2012/0102136 A1 | 4/2012 | Srebrny | |
| 2012/0106339 A1 | 5/2012 | Mishra | |
| 2012/0110159 A1 | 5/2012 | Richardson | |
| 2012/0114313 A1 | 5/2012 | Phillips | |
| 2012/0120803 A1 | 5/2012 | Farkas | |
| 2012/0127994 A1 | 5/2012 | Ko | |
| 2012/0136676 A1 | 5/2012 | Goodall | |
| 2012/0136936 A1 | 5/2012 | Quintuna | |
| 2012/0136945 A1 | 5/2012 | Lee | |
| 2012/0137367 A1 | 5/2012 | Dupont | |
| 2012/0141093 A1 | 6/2012 | Yamaguchi | |
| 2012/0155464 A1 | 6/2012 | Kim | |
| 2012/0158973 A1 | 6/2012 | Jacobson | |
| 2012/0163373 A1 | 6/2012 | Lo | |
| 2012/0166433 A1 | 6/2012 | Tseng | |
| 2012/0170913 A1 | 7/2012 | Isozaki | |
| 2012/0179653 A1 | 7/2012 | Araki | |
| 2012/0197690 A1 | 8/2012 | Agulnek | |
| 2012/0198048 A1 | 8/2012 | Ioffe | |
| 2012/0221150 A1 | 8/2012 | Arensmeier | |
| 2012/0224487 A1 | 9/2012 | Hui | |
| 2012/0226902 A1 | 9/2012 | Kim | |
| 2012/0257500 A1 | 10/2012 | Lynch | |
| 2012/0284791 A1 | 11/2012 | Miller | |
| 2012/0290669 A1 | 11/2012 | Parks | |
| 2012/0290919 A1 | 11/2012 | Melnyk | |
| 2012/0291102 A1 | 11/2012 | Cohen | |
| 2012/0300669 A1 | 11/2012 | Zahavi | |
| 2012/0307629 A1 | 12/2012 | Vasseur | |
| 2012/0314580 A1 | 12/2012 | Hong | |
| 2012/0317307 A1 | 12/2012 | Ravindran | |
| 2012/0317655 A1* | 12/2012 | Zhang | G06F 21/6218 726/28 |
| 2012/0322422 A1 | 12/2012 | Frecks | |
| 2012/0323933 A1 | 12/2012 | He | |
| 2012/0331112 A1 | 12/2012 | Chatani | |
| 2013/0024560 A1 | 1/2013 | Vasseur | |
| 2013/0041982 A1 | 2/2013 | Shi | |
| 2013/0051392 A1 | 2/2013 | Filsfils | |
| 2013/0054971 A1 | 2/2013 | Yamaguchi | |
| 2013/0060962 A1* | 3/2013 | Wang | H04L 67/327 709/238 |
| 2013/0061084 A1 | 3/2013 | Barton | |
| 2013/0064368 A1* | 3/2013 | Lefebvre | H04N 21/2389 380/217 |
| 2013/0066823 A1 | 3/2013 | Sweeney | |
| 2013/0073552 A1 | 3/2013 | Rangwala | |
| 2013/0073882 A1 | 3/2013 | Inbaraj | |
| 2013/0074155 A1 | 3/2013 | Huh | |
| 2013/0090942 A1 | 4/2013 | Robinson | |
| 2013/0091237 A1 | 4/2013 | Ambalavanar | |
| 2013/0091539 A1 | 4/2013 | Khurana | |
| 2013/0108039 A1* | 5/2013 | Gong | H04L 9/0662 380/28 |
| 2013/0110987 A1 | 5/2013 | Kim | |
| 2013/0111063 A1 | 5/2013 | Lee | |
| 2013/0128786 A1 | 5/2013 | Sultan | |
| 2013/0132719 A1 | 5/2013 | Kobayashi | |
| 2013/0139245 A1 | 5/2013 | Thomas | |
| 2013/0151584 A1* | 6/2013 | Westphal | H04L 67/06 709/202 |
| 2013/0151646 A1 | 6/2013 | Chidambaram | |
| 2013/0152070 A1 | 6/2013 | Bhullar | |
| 2013/0163426 A1 | 6/2013 | Beliveau | |
| 2013/0166668 A1 | 6/2013 | Byun | |
| 2013/0173822 A1 | 7/2013 | Hong | |
| 2013/0182568 A1 | 7/2013 | Lee | |
| 2013/0182931 A1 | 7/2013 | Fan | |
| 2013/0185406 A1 | 7/2013 | Choi | |
| 2013/0191412 A1 | 7/2013 | Kitamura | |
| 2013/0197698 A1 | 8/2013 | Shah | |
| 2013/0198119 A1 | 8/2013 | Eberhardt, III | |
| 2013/0212185 A1 | 8/2013 | Pasquero | |
| 2013/0219038 A1 | 8/2013 | Lee | |
| 2013/0219081 A1 | 8/2013 | Qian | |
| 2013/0219478 A1 | 8/2013 | Mahamuni | |
| 2013/0223237 A1 | 8/2013 | Hui | |
| 2013/0227048 A1 | 8/2013 | Xie | |
| 2013/0227114 A1 | 8/2013 | Vasseur | |
| 2013/0227166 A1 | 8/2013 | Ravindran | |
| 2013/0242996 A1 | 9/2013 | Varvello | |
| 2013/0250809 A1 | 9/2013 | Hui | |
| 2013/0262365 A1 | 10/2013 | Dolbear | |
| 2013/0262698 A1 | 10/2013 | Schwan | |
| 2013/0275544 A1 | 10/2013 | Westphal | |
| 2013/0282854 A1 | 10/2013 | Jang | |
| 2013/0282860 A1 | 10/2013 | Zhang | |
| 2013/0282920 A1 | 10/2013 | Zhang | |
| 2013/0304758 A1 | 11/2013 | Gruber | |
| 2013/0304937 A1 | 11/2013 | Lee | |
| 2013/0325888 A1 | 12/2013 | Oneppo | |
| 2013/0329696 A1 | 12/2013 | Xu | |
| 2013/0332971 A1 | 12/2013 | Fisher | |
| 2013/0336103 A1 | 12/2013 | Vasseur | |
| 2013/0336323 A1 | 12/2013 | Srinivasan | |
| 2013/0339481 A1 | 12/2013 | Hong | |
| 2013/0343408 A1 | 12/2013 | Cook | |
| 2014/0003232 A1 | 1/2014 | Guichard | |
| 2014/0003424 A1 | 1/2014 | Matsuhira | |
| 2014/0006354 A1 | 1/2014 | Parkison | |
| 2014/0006565 A1 | 1/2014 | Muscariello | |
| 2014/0029445 A1 | 1/2014 | Hui | |
| 2014/0032714 A1 | 1/2014 | Liu | |
| 2014/0033193 A1 | 1/2014 | Palaniappan | |
| 2014/0040505 A1 | 2/2014 | Barton | |
| 2014/0040628 A1 | 2/2014 | Fort | |
| 2014/0043987 A1 | 2/2014 | Watve | |
| 2014/0047513 A1 | 2/2014 | vantNoordende | |
| 2014/0074730 A1 | 3/2014 | Arensmeier | |
| 2014/0075567 A1 | 3/2014 | Raleigh | |
| 2014/0082135 A1 | 3/2014 | Jung | |
| 2014/0082661 A1 | 3/2014 | Krahnstoever | |
| 2014/0089454 A1 | 3/2014 | Jeon | |
| 2014/0096249 A1 | 4/2014 | Dupont | |
| 2014/0098685 A1 | 4/2014 | Shattil | |
| 2014/0108313 A1 | 4/2014 | Heidasch | |
| 2014/0108474 A1 | 4/2014 | David | |
| 2014/0115037 A1 | 4/2014 | Liu | |
| 2014/0122587 A1 | 5/2014 | Petker et al. | |
| 2014/0129736 A1 | 5/2014 | Yu | |
| 2014/0136814 A1 | 5/2014 | Stark | |
| 2014/0140348 A1 | 5/2014 | Perlman | |
| 2014/0143370 A1 | 5/2014 | Vilenski | |
| 2014/0146819 A1 | 5/2014 | Bae | |
| 2014/0149733 A1* | 5/2014 | Kim | H04L 67/1097 713/153 |
| 2014/0156396 A1 | 6/2014 | deKozan | |
| 2014/0165207 A1 | 6/2014 | Engel | |
| 2014/0172783 A1 | 6/2014 | Suzuki | |
| 2014/0172981 A1 | 6/2014 | Kim | |
| 2014/0173034 A1 | 6/2014 | Liu | |
| 2014/0173076 A1 | 6/2014 | Ravindran | |
| 2014/0181140 A1 | 6/2014 | Kim | |
| 2014/0192677 A1 | 7/2014 | Chew | |
| 2014/0192717 A1 | 7/2014 | Liu | |
| 2014/0195328 A1 | 7/2014 | Ferens | |
| 2014/0195641 A1 | 7/2014 | Wang | |
| 2014/0195666 A1 | 7/2014 | Dumitriu | |
| 2014/0204945 A1 | 7/2014 | Byun | |
| 2014/0214942 A1 | 7/2014 | Ozonat | |
| 2014/0233575 A1 | 8/2014 | Xie | |
| 2014/0237085 A1 | 8/2014 | Park | |
| 2014/0237095 A1 | 8/2014 | Bevilacqua-Linn | |
| 2014/0245359 A1 | 8/2014 | DeFoy | |
| 2014/0254595 A1 | 9/2014 | Luo | |

(56) References Cited

U.S. PATENT DOCUMENTS

| | | | |
|---|---|---|---|
| 2014/0280823 A1 | 9/2014 | Varvello | |
| 2014/0281489 A1 | 9/2014 | Peterka | |
| 2014/0281505 A1 | 9/2014 | Zhang | |
| 2014/0282816 A1 | 9/2014 | Xie | |
| 2014/0289325 A1 | 9/2014 | Solis | |
| 2014/0289790 A1 | 9/2014 | Wilson | |
| 2014/0298248 A1 | 10/2014 | Kang | |
| 2014/0314093 A1 | 10/2014 | You | |
| 2014/0337276 A1 | 11/2014 | Iordanov | |
| 2014/0365550 A1 | 12/2014 | Jang | |
| 2015/0006896 A1 | 1/2015 | Franck | |
| 2015/0018770 A1 | 1/2015 | Baran | |
| 2015/0032892 A1 | 1/2015 | Narayanan | |
| 2015/0033365 A1 | 1/2015 | Mellor | |
| 2015/0039890 A1 | 2/2015 | Khosravi | |
| 2015/0063802 A1 | 3/2015 | Bahadur | |
| 2015/0089081 A1 | 3/2015 | Thubert | |
| 2015/0095481 A1 | 4/2015 | Ohnishi | |
| 2015/0095483 A1* | 4/2015 | Muramoto | G06Q 10/00 709/223 |
| 2015/0095514 A1 | 4/2015 | Yu | |
| 2015/0120663 A1 | 4/2015 | LeScouarnec | |
| 2015/0169758 A1 | 6/2015 | Assom | |
| 2015/0188770 A1 | 7/2015 | Naiksatam | |
| 2015/0195149 A1 | 7/2015 | Vasseur | |
| 2015/0207633 A1 | 7/2015 | Ravindran | |
| 2015/0207864 A1 | 7/2015 | Wilson | |
| 2015/0222424 A1* | 8/2015 | Mosko | H04L 9/08 713/171 |
| 2015/0222435 A1* | 8/2015 | Lea | H04L 63/0823 713/155 |
| 2015/0279348 A1 | 10/2015 | Cao | |
| 2015/0288755 A1 | 10/2015 | Mosko | |
| 2015/0312300 A1 | 10/2015 | Mosko | |
| 2015/0349961 A1 | 12/2015 | Mosko | |
| 2015/0372903 A1 | 12/2015 | Hui | |
| 2015/0381546 A1 | 12/2015 | Mahadevan | |
| 2016/0019275 A1 | 1/2016 | Mosko | |
| 2016/0021172 A1 | 1/2016 | Mahadevan | |
| 2016/0062840 A1 | 3/2016 | Scott | |
| 2016/0080327 A1* | 3/2016 | Yoneda | H04L 63/0428 713/153 |
| 2016/0105279 A1* | 4/2016 | Zheng | H04L 9/0822 713/171 |
| 2016/0110466 A1 | 4/2016 | Uzun | |
| 2016/0171184 A1 | 6/2016 | Solis | |
| 2016/0182228 A1* | 6/2016 | Smith | H04L 9/0841 713/171 |
| 2016/0255180 A1* | 9/2016 | Bae | H04L 67/327 370/474 |
| 2016/0359822 A1* | 12/2016 | Rivera | H04L 63/061 |
| 2017/0085441 A1* | 3/2017 | Azgin | H04L 43/028 |
| 2017/0111330 A1* | 4/2017 | Mosko | H04L 9/00 |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2928149 A1 | 10/2015 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2014023072 | 2/2014 |
| WO | 2015084327 | 6/2015 |

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking (Feb. 2009).

"PBC Library-Pairing-Based Cryptography-About," http://crypto.stanford.edu/pbc. downloaded Apr. 27, 2015.

C. Gentry and A. Silverberg. Hierarchical ID-Based Cryptography. Advances in Cryptology—ASIACRYPT 2002. Springer Berlin Heidelberg (2002).

Boneh et al., "Collusion Resistant Broadcast Encryption With Short Ciphertexts and Private Keys", 2005.

D. Boneh and M. Franklin. Identity-Based Encryption from the Weil Pairing. Advances in Cryptology—CRYPTO 2001, vol. 2139, Springer Berlin Heidelberg (2001).

Anteniese et al., "Improved Proxy Re-Encryption Schemes with Applications to Secure Distributed Storage", 2006.

Xiong et al., "CloudSeal: End-to-End Content Protection in Cloud-based Storage and Delivery Services", 2012.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Lotspiech, S. Nusser, and F. Pestoni. Anonymous Trust: Digit.

J. Shao and Z. Cao. CCA-Secure Proxy Re-Encryption without Pairings. Public Key Cryptography. Springer Lecture Notes in Computer Science vol. 5443 (2009).

Gopal et al. "Integrating content-based Mechanisms with hierarchical File systems", Feb. 1999, University of Arizona, 15 pages.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

RTMP (2009). Available online at http://wwwimages.adobe.com/www.adobe.com/content/dam/Adobe/en/devnet/rtmp/ pdf/rtmp specification 1.0.pdf.

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

S. Kamara and K. Lauter. Cryptographic Cloud Storage. Financial Cryptography and Data Security. Springer Berlin Heidelberg (2010).

Sandvine, Global Internet Phenomena Report—Spring 2012. Located online at http://www.sandvine.com/downloads/ documents/ Phenomenal H 2012/Sandvine Global Internet Phenomena Report 1H 2012.pdf.

The Despotify Project (2012). Available online at http://despotify.sourceforge.net/.

V. K. Adhikari, S. Jain, Y. Chen, and Z.-L. Zhang. Vivisecting Youtube:An Active Measurement Study. In INFOCOM12 Mini-conference (2012).

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

(56) References Cited

OTHER PUBLICATIONS

Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. (Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 (2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

(56) References Cited

OTHER PUBLICATIONS

Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.

Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.

(56) References Cited

OTHER PUBLICATIONS

T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

Vutukury, Srinivas, and J. J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592. Ernest Orlando Lawrence Berkeley National Laboratory, Berkeley, CA (US), 2003.

Wang, Jiangzhe et al., "DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014): 66-73.

Soh et al., "Efficient Prefix Updates for IP Router Using Lexicographic Ordering and Updateable Address Set", Jan. 2008, IEEE Transactions On Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network and Computer Applications 35 (2012) 221-229.

D. Trossen and G. Parisis, "Designing and realizing and information-centric Internet," IEEE Communications Magaziny, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

lshiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

Kaya et al., "A Low Power Lookup Technique for Multi-Hashing Network Applications", 2006 IEEE Computer Society Annual Symposium on Emerging VLSI Technologies and Architectures, Mar. 2006.

Hogue et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

Wetherall, David, "Active Network vision and reality: Lessons form a capsule-based system", ACM Symposium on Operating Systems Principles, Dec. 1, 1999. Pages 64-79.

Kulkarni A.B. et al., "Implementation of a prototype active network", IEEE, Open Architectures and Network Programming, Apr. 3, 1998, pp. 130-142.

Xie et al. "Collaborative Forwarding and Caching in Content Centric Networks", Networking 2012.

European Search Report in counterpart European Application No. 16192113.5, dated Mar. 16, 2017, 11 pages.

Mosko, et al., "CCNx Messages in TLV Format," ICNRG, Internet-Draft, Experimental, Jun. 29, 2015, 33 pages.

Jacobson, et al., "Networking Named Content," CoNEXT'09, Dec. 2009, 12 pages.

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

Amadeo et al. "Design and Analysis of a Transport-Level Solution for Content-Centric VANETs", University "Mediterranea" of Reggio Calabria, Jun. 15, 2013.

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].

Akash Baid et al: *Comparing alternative approaches for networking of named objects in the future Internet*, Computer Communications Workshops (Infocom Wkshps), 2012 IEEE Conference on, IEEE, Mar. 25, 2012, pp. 298-303, *Paragraph [002]* *figure 1*.

Priya Mahadevan: *CCNx 1.0 Tutorial*, Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* *figures 1,2*.

Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.

Cesar Ghali et al. *Elements of Trust in Named-Data Networking*, Feb. 13, 2014 Retrieved from the internet Jun. 17, 2016 http://arxiv.org/pdf/1402.3332v5.pdf *p. 5, col. 1* *p. 2, col. 1—2* * Section 4.1; p. 4, col. 2* *Section 4.2; p. 4, col. 2*.

Priya Mahadevan et al. "CCN-KRS", Proceedings of the 1st International Conference on Information-Centric Networking, Inc. '14, Sep. 24, 2014.

Flavio Roberto Santos et al. "Funnel: Choking Polluters in BitTorrent File Sharing Communities", IEEE Transactions on Network and Service Management, IEEE vol. 8, No. 4, Dec. 1, 2011.

Liu Wai-Xi et al: "Multisource Dissemination in content-centric networking", 2013 Fourth International conference on the network of the future (NOF), IEEE, Oct. 23, 2013, pp. 1-5.

(56) References Cited

OTHER PUBLICATIONS

Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.
Gelenbe et al.: "Networks With Cognitive Packets", Modeling, Analysis and Simulation of Computer and Telecommunication Systems, 2000. IEEE, Aug. 29, 2000, pp. 3-10.
Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.
Smetters et al. "Securing Network Content" Technical Report, PARC TR-2009-1, Oct. 1, 2009, Retrieved from the internet URL:http//www.parc.com/content/attachments/TR-2009-01.pdf [retrieved Nov. 1, 2016].
Marc Mosko "CCNx Label Forwarding (CCNLF)" Jul. 21, 2014.
Gallo Alcatel-Lucent Bell Labs "Content-Centric Networking Packet Header Format" Jan. 26, 2015.
Huard J-F et al. "A Programmable Transport Architecture with QOS Guarantees" IEEE Communications Magazine, vol. 36, No. 10, Oct. 1, 1998.
Microsoft Computer Dictionary, Fifth Edition, 2002, Microsoft Press, p. 23.
Mind—A Brief Introduction, John R. Searle, 2004, Oxford University Press, pp. 62-67.

* cited by examiner

| | | | |
|---|---|---|---|
| 502 { | T_VALALG | Length | |
| 506 { | T_KEYID | Length | KeyId |
| 512 { | T_NONCE | 1-8 | Nonce (IV) |
| 518 { | T_CONTAINER | 2 | TE Value |
| 524 { | T_VALPAYLOAD | 8, 12, 16 | |
| 528 { | Authenticator | | |

FIG. 5

ENCRYPTED CCNX

RELATED APPLICATION

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");

U.S. Pat. No. 8,386,622, entitled "METHOD AND APPARATUS FOR FACILITATING COMMUNICATION IN A CONTENT CENTRIC NETWORK," by inventors Van Jacobson, filed 11 Dec. 2008 (hereinafter "U.S. Pat. No. 8,386,622");

U.S. Pat. No. 8,204,060, entitled "METHOD AND SYSTEM FOR FACILITATING FORWARDING A PACKET IN A CONTENT-CENTRIC NETWORK," by inventor Van L. Jacobson and James D. Thornton, filed 17 Dec. 2009 (hereinafter "U.S. Pat. No. 8,204,060"); and U.S. patent application Ser. No. 14/065,691, entitled "SYSTEM AND METHOD FOR HASH-BASED FORWARDING OF PACKETS WITH HIERARCHICALLY STRUCTURED VARIABLE-LENGTH IDENTIFIERS," by inventors Marc E. Mosko and Michael F. Plass, filed 29 Oct. 2013 (hereinafter "U.S. patent application Ser. No. 14/065,691");

the disclosures of which are herein incorporated by reference in their entirety.

BACKGROUND

Field

This disclosure is generally related to distribution of digital content. More specifically, this disclosure is related to a system and method for selectively encrypting bit groups (such as name components) based on multiple symmetric keys in a content centric network message.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level.

Part of a CCN name can be used for routing purposes, and part of the name can contain sensitive data. For example, some name components may be used by an intermediate node to perform forwarding and caching, while other name components may contain private user information or application-specific data. Current CCN packet formats may include authentication as a primary objective, while previous CCN packet formats may include encryption functionality but are designed to encrypt only the payload while providing authentication for the entire packet. These packet formats do not allow for session-based and pair-wise encryption between two entities, nor do they provide a way to selectively encrypt portions of a CCN packet or message.

SUMMARY

One embodiment provides a system that facilitates selective encryption of bit groups of a message. During operation, the system determines, by a content requesting device or content producing device, a message that includes a plurality of bit groups, each corresponding to a type, a length, and a set of values, wherein one or more bit groups are marked for encryption, and wherein the message indicates a name that is a hierarchically structured variable-length identifier comprising contiguous name components ordered from a most general level to a most specific level. The system computes a plurality of cipher blocks for the message based on an authenticated encryption protocol. The system encrypts the one or more bit groups marked for encryption based on one or more symmetric keys, wherein the marked bit groups include one or more name components. Subsequently, the system indicates the encrypted bit groups as encrypted.

In some embodiments, the message is an interest packet or a content object packet.

In some embodiments, the system transmits the selectively encrypted message to a content producing device or a content requesting device.

In some embodiments, computing the cipher blocks is further based on beginning at byte zero of the message.

In some embodiments, computing the cipher blocks is further based on an Advanced Encryption Standard using a key with a length of 128 bits.

In some embodiments, encrypting the bit groups is further based on an exclusive disjunction operation.

In some embodiments, indicating the encrypted bit groups as encrypted comprises one or more of: setting a field associated with the bit group in the message; and setting a reserved bit associated with the bit group in the message.

In some embodiments, the system includes in a validation section for the message a nonce and a key identifier for each of the symmetric keys.

In some embodiments, the system further comprises one or more of the following: wherein a symmetric key is exchanged via a public key operation; wherein a symmetric key is encrypted based on a public key included in the message; wherein the validation section is based on a symmetric key cryptographic system with encryption; wherein a public key identifier of the content producing device is included in the message; and wherein a short symmetric key identifier is specified for use in subsequent messages between the content requesting device and the content producing device.

In some embodiments, the system further comprises one or more of the following: wherein the public key operation is based on a cryptographic system that is RSA-SHA256; and wherein the short symmetric key identifier is a random number that is not derived from the symmetric key.

In some embodiments, the system receives the selectively encrypted message. In response to verifying authentication information associated with the message, the system decrypts, for each bit group indicated as encrypted, the encrypted bit group based on a corresponding symmetric key, wherein a nonce and a key identifier for each of the symmetric keys are included in a validation section for the message. The system indicates the decrypted bit groups as decrypted.

In some embodiments, verifying the authentication information associated with the message further comprises: looking up in a storage a key identifier associated with the message; and verifying a signature or a message authentication code based on the key identifier.

BRIEF DESCRIPTION OF THE FIGURES

FIG. 5 illustrates an exemplary format for a validation section of a selectively encrypted CCN message, in accordance with an embodiment of the present invention.

In the figures, like reference numerals refer to the same figure elements.

DETAILED DESCRIPTION

Figure 1:
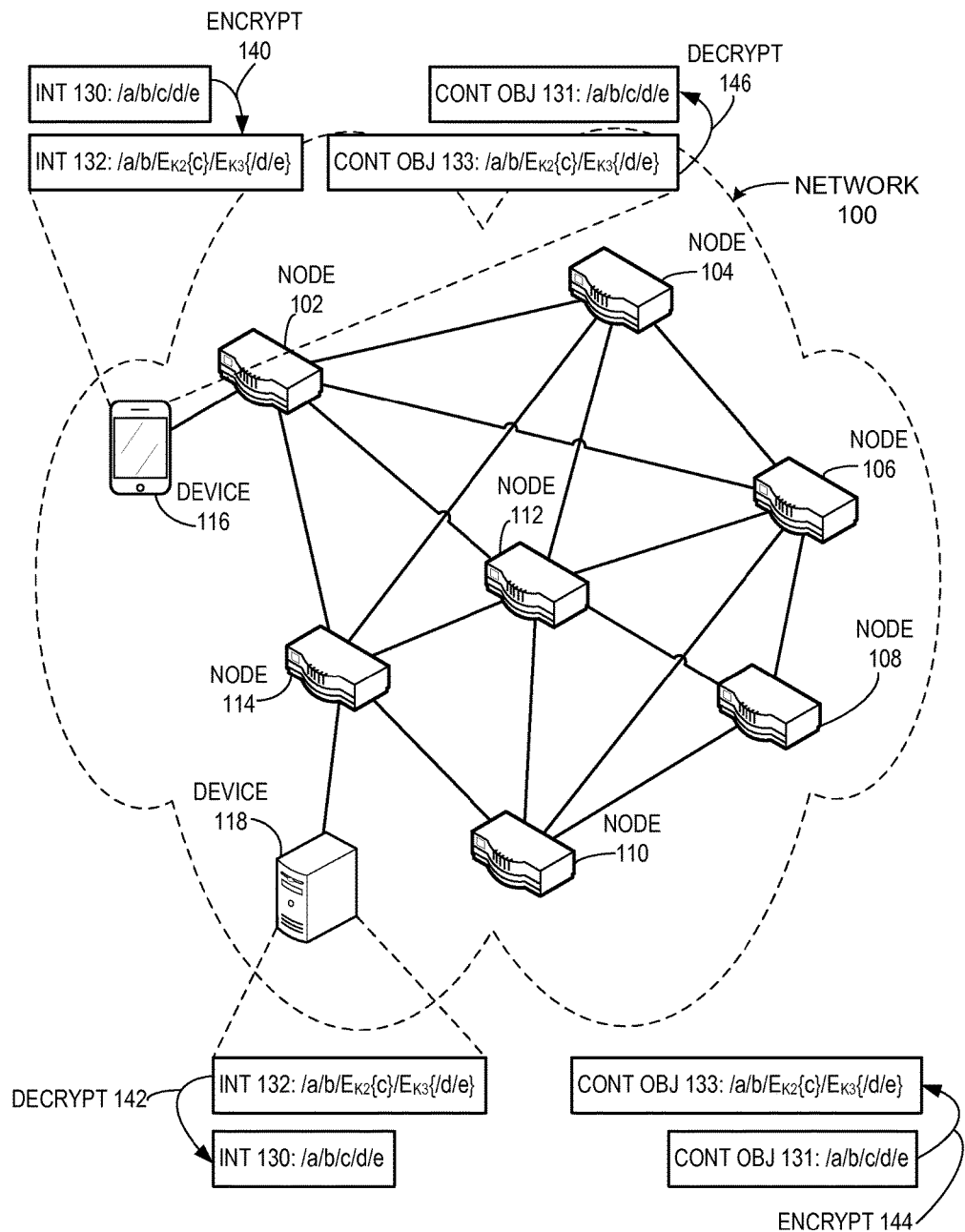
FIG. 1 illustrates an exemplary network facilitating selective encryption of bit groups of a CCN message, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which solves the problem of effectively combining authentication and encryption for a packet by facilitating two communicating entities to use multiple different and mutually known keys to encrypt selected portions of a CCN message. Assume that two entities, such as a consumer and a producer, share multiple secret keys based on a known key exchange protocol. The consumer may wish to transmit an interest packet where portions, or "bit groups," of the packet may require encryption. For example, the name components of the interest name may contain both routable information and sensitive, application-specific information. The consumer may selectively encrypt various name components by placing a container around a name component, marking the name component as encrypted based on a specific key, and indicating the specific key in a validation section for the packet. Exemplary packet formats with encrypted containers are described below in relation to FIGS. 4A-C. The producer can receive the selectively encrypted interest, verify authentication information in the validation section based on the specific keys indicated, and subsequently decrypt each encrypted name component (or bit group) based on the indicated key. The producer can generate a responsive content object and assign the responsive content object with the same selectively encrypted name as the incoming interest. Based on the same methods used by the consumer to selectively encrypt the interest, the producer can also encrypt additional portions of the responsive content object based on other mutually known keys.

Specifically, the system uses an authenticated encryption with associated data (AEAD) scheme which simultaneously protects both the privacy and authenticity/integrity of encapsulated data. Given a TLV-formatted packet (e.g., a packet comprised of bit groups where each bit group corresponds to a type, a length, and a set of values), a consumer may use an AEAD scheme to encrypt selective bit groups (such as name components) for the packet. An example of an AEAD scheme that follows an "encrypt-then-authenticate" paradigm as used with a modified TLV-formatted CCN packet is described below in the section entitled "Exemplar Authenticated Encryption Protocol Over Encrypted Containers."

The following terms describe elements of a CCN architecture:

Content Object or "content object": A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/ test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814, which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest or "interest": A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175, which is hereby incorporated by reference.

Exemplary Network and Communication

FIG. 1 illustrates an exemplary network facilitating selective encryption of bit groups of a CCN message, in accordance with an embodiment of the present invention. Network 100 can be a content centric network (CCN) and can include a client device 116, a content producing device 118, and a router or other forwarding device at nodes 102, 104, 106, 108, 110, 112, and 114. A CCN router can be a CCN forwarding device residing on top of an IP router. In other words, CCN can be implemented as an overlay on top of IP. Other CCN overlay architecture is also possible. A node can be a computer system, an end-point representing users, and/or a device that can generate interests or originate content.

A requesting entity or content consumer (such as device 116) can generate or determine an interest 130 with an original name of "/a/b/c/d/e." Consumer 116 can selectively encrypt interest 130 via an encrypt 140 function, which results in an interest 132 with a selectively encrypted name of "/a/b/$E_{K2}$ {c}/$E_{K3}$ {/d/e}." Interest 132 has two selectively encrypted name components (e.g., "containers" or "bit groups"): 1) name component "c" is encrypted using the symmetric key K2; and 2) name components "/d/e" are encrypted using the symmetric key K3. The keys K2 and K3 are mutually known to consumer 116 and producer 118. Possible key exchange protocols are described below in the section entitled "Possible Methods for Sharing Symmetric Keys." For each symmetric key used to encrypt a name component, the encrypt 140 function can be further based on an authenticated encryption with associated data (AEAD) protocol. As described below, an AEAD scheme can generate an authenticator tag for a respective encrypted container, and consumer 116 can include the authenticator tag in a corresponding validation section for the message. Consumer 116 can transmit selectively encrypted interest 132 through the network. Interest 132 is received and forwarded by intermediate nodes 102 and 114, until it reaches content producing device or content producer 118.

Producer 118 verifies the authentication information (e.g., the authenticator tag included in the validation section for the message). Upon properly verifying the authentication information, producer 118 decrypts each encrypted name component for interest 132 via a decrypt 142 function, based on the information in the validation section. The validation section includes information to identify which symmetric key to use for each encrypted name component (or bit group), as described below in relation to FIG. 5. The decrypt 142 function results in interest 130 with the original name "/a/b/c/d/e." Producer 118 then generates or produces a content object 131 that is responsive to interest 130. Producer 118 can selectively encrypt content object 131 (e.g., name components of content object 131) to match the name for interest 132 via an encrypt 144 function, which results in content object 133. Producer 118 can also encrypt other bit groups of content object 133 using the same encryption keys previously used by consumer 116 (e.g., K2 and K3). Producer 118 can further encrypt other bit groups of content object 133 using yet another symmetric key shared between the parties (e.g., K4, not shown). In some embodiments, producer 118 can also wrap content object 133 with an outer container, as described below in the section entitled "Wrapping Method." Producer 118 can transmit content object 133 through the network. Content object 133 travels on a reverse path as interest 132, e.g., back through intermediate nodes 114 and 102, until it reaches consumer 116.

Upon receiving content object 133, consumer 116 performs similar steps to verify and decrypt selectively encrypted content object 133 as producer 118 performs to verify and decrypt selectively encrypted interest 132. For example, consumer 116 verifies the authentication information in content object 133, and upon verifying the authentication information, consumer 116 begins decrypting the encrypted bit groups or name components of content object 133 via a decrypt 146 function, based on the information in the validation section. The decrypt 146 function results in a content object 131 with the original name "/a/b/c/d/e." Consumer 116 can subsequently perform a lookup and clear a corresponding entry in its pending interest table (PIT) for interest 132 and/or interest 130.

Selectively Encrypting a CCN Message

Figure 2:
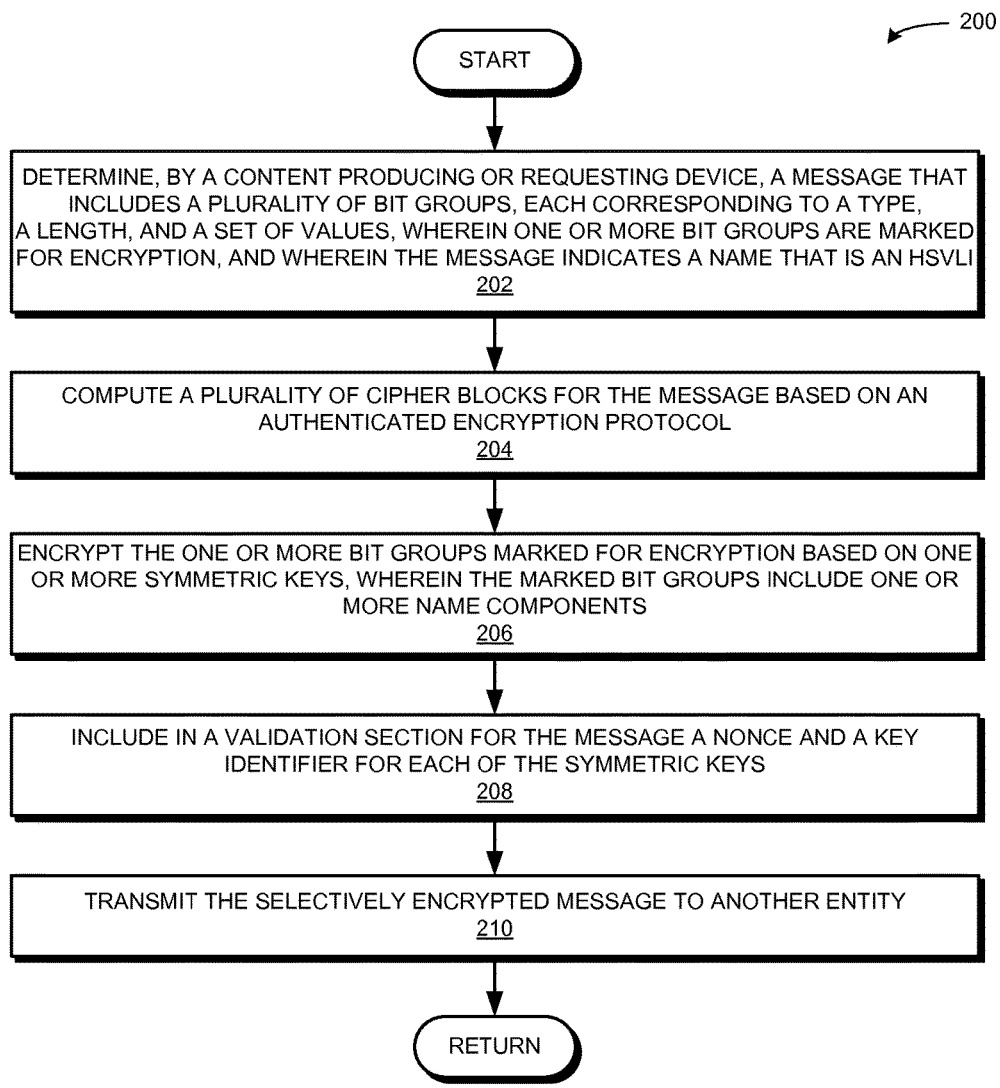
FIG. 2 presents a flow chart illustrating a method by a content requesting device or a content producing device for selectively encrypting a CCN message, in accordance with an embodiment of the present invention.

FIG. 2 presents a flow chart 200 illustrating a method by a content requesting device or a content producing device for selectively encrypting a CCN message, in accordance with an embodiment of the present invention. During operation, the system determines, by a content producing device or a content requesting device, a message that includes a plurality of bit groups, where each bit group corresponds to a type, a length, and a set of values, and where one or more bits are marked for encryption (operation 202). The message also indicates a name that is a hierarchically structured variable-length identifier comprising contiguous name components ordered from a most general level to a most specific level. The message can be an interest packet or a content object packet. The system then computes a plurality of cipher blocks for the message based on an authenticated encryption protocol (operation 204). The authenticated encryption protocol can be an "encrypt-then-authenticate" scheme that simultaneously encrypts and authenticates more data than it encrypts. One example of such an authenticated encryption with associated data (AEAD) scheme is Advanced Encryption Standard in Galois/Counter Mode (AES-GCM), as described below. The system encrypts the one or more bit groups marked for encryption based on one or more symmetric keys, where the marked bit groups include one or more name components (operation 206). The bit groups can also include the payload and any other bit groups or TLV-formatted groups that an encryptor may wish to encrypt. In addition, the encryptor can perform a nested encryption of bit groups, as described below in relation to FIG. 4C.

The system includes in a validation section for the message a nonce and a key identifier (KeyId) for each of the symmetric keys used to encrypt a bit group (operation 208). Possible symmetric key exchange protocols are discussed below in the section entitled "Possible Methods For Sharing Symmetric Keys." Subsequently, the system transmits the selectively encrypted message to another entity (operation 210). For example, the CCN message can be an interest packet that is selectively encrypted and transmitted from a content requesting device to a content producing device. The content producing device can subsequently return to the content requesting device a responsive content object that has the same selectively encrypted name. The responsive content object can be further selectively encrypted.

Exemplar Authenticated Encryption Protocol Over Encrypted Containers

Block cipher modes of operation can simultaneously protect both the privacy and the authenticity or integrity of encapsulated data. Such authenticated encryption (AE) schemes can also authenticate more data than they encrypt, and are referred to as authenticated encryption with associated data (AEAD) schemes. One example of an AEAD scheme is the Advance Encryption Standard in Galois/Counter Mode (AES-GCM), used with block ciphers with a block size of 128 bits. AES-GCM uses the "encrypt-then-authenticate" paradigm. The scheme is based on a secret key K, a nonce (e.g., Initialization Vector or IV), and a counter per nonce. The selectively encrypted packet carries a KeyId and a nonce. As described in IETF RFC 4106, "The Use of Galois/Counter Mode (GCM) in IPsec Encapsulating Security Payload (ESP)" (June 2005) (hereinafter "RFC 4106"), which disclosure is herein incorporated in its entirety, the KeyId identifies a (key, salt) pair which is created during association setup. The nonce is 1-8 bytes in size and is carried in the validation section for the packet, as described below in relation to FIG. 5. The nonce is left-padded with zeros to 8 bytes and appended to the salt to form the GCM-AES IV. Note that the nonce in the packet may also be a counter.

To encrypt the packet using the GCM-AES scheme, an encryptor uses the following inputs: the secret key K; distinct Initialization Vectors IV (typically 96 bits); plaintext P (up to $2^{39}$-256 bits); and associated data A (up to 264 bits). Using these inputs, the encryptor creates the following outputs: the ciphertext C (with a length equal to P); and the authentication tag T (0-128 bits). Authentication tag T is constructed by feeding blocks of data into the GHASH function and encrypting the result. For example, the GHASH function can be defined by GHASH(H,A,C): H is the hash key, a string of 128 zero-bits encrypted using the block cipher; A is the associated data which is only authenticated but not encrypted; and C is the ciphertext. Thus, the function GHASH of GCM-AES is performed over all of C and A for each encrypted container.

The decryptor receives the outputs, C and T, along with A (which can include a plaintext header, tail, or other meta information), and can determine K and IV based on a previous key exchange protocol. The decryptor thus uses inputs K, IV, C, A, and T to determine the output, which is either the plaintext P or a "FAIL" result.

Each encrypted bit group of a CCN message is an independent key/nonce execution of the GCM-AES scheme. The encryptor can perform an exclusive disjunction (i.e., XOR) operation on the "value" of the encrypted container. Thus, the ciphertext C contains a mixture of some XOR'd bytes and some plaintext bytes. The associated data A comprises all prior validation sections as well as the current validation section. An exemplary format of a validation section is described below in relation to FIG. 5.

The byte counter can run from byte 0 of the message to the end of the message to clarify that the ciphertext C is the entire CCNx message. An encryptor does not need to compute AES blocks $E(K,Y_i)$ for message sections that fall outside of the XOR range. In some embodiments, the encryptor can use only the "value" bytes of specific encrypted containers and perform encryption over the compacted range. While this may provide more compatibility with existing GCM-AES implementations, the encryptor may need to make all the uncovered bytes part of the associated data A, which may require additional overhead to properly encode the lengths.

Possible Methods for Sharing Symmetric Keys

Communicating entities need to exchange symmetric keys. In one method, the entities exchange symmetric keys via a public key operation. The public key operation can be based on a cryptographic system that is, e.g., RSA-SHA256. The wrapped key can be included in the message using the key, i.e., the message embeds its own decryption key under a public key operation. In another method, two communicating entities exchange a separate message with the wrapped key, then refer to it with an agreed to identifier. In another method, two communicating entities use an on-line key exchange mechanism, such as a version of Diffie Hillman key exchange.

Communicating entities need to identify the symmetric key(s) used to encrypt portions of a message. In embodiments of the present invention, the encryptor can establish one or more encryption contexts identified by a given TLV Type value. At the end of the message, in the ValidationAlgorithm section, the encryptor can associate the encryption context with a KeyId for the symmetric key. The KeyId of a symmetric key may be a small integer value agreed upon by the parties. The KeyId values may be relative to the name prefix used in the message exchanges, which allows the same KeyId value to be used in multiple communications with different name prefixes without ambiguity.

Verifying and Decrypting a Selectively Encrypted CCN Message

Figure 3:
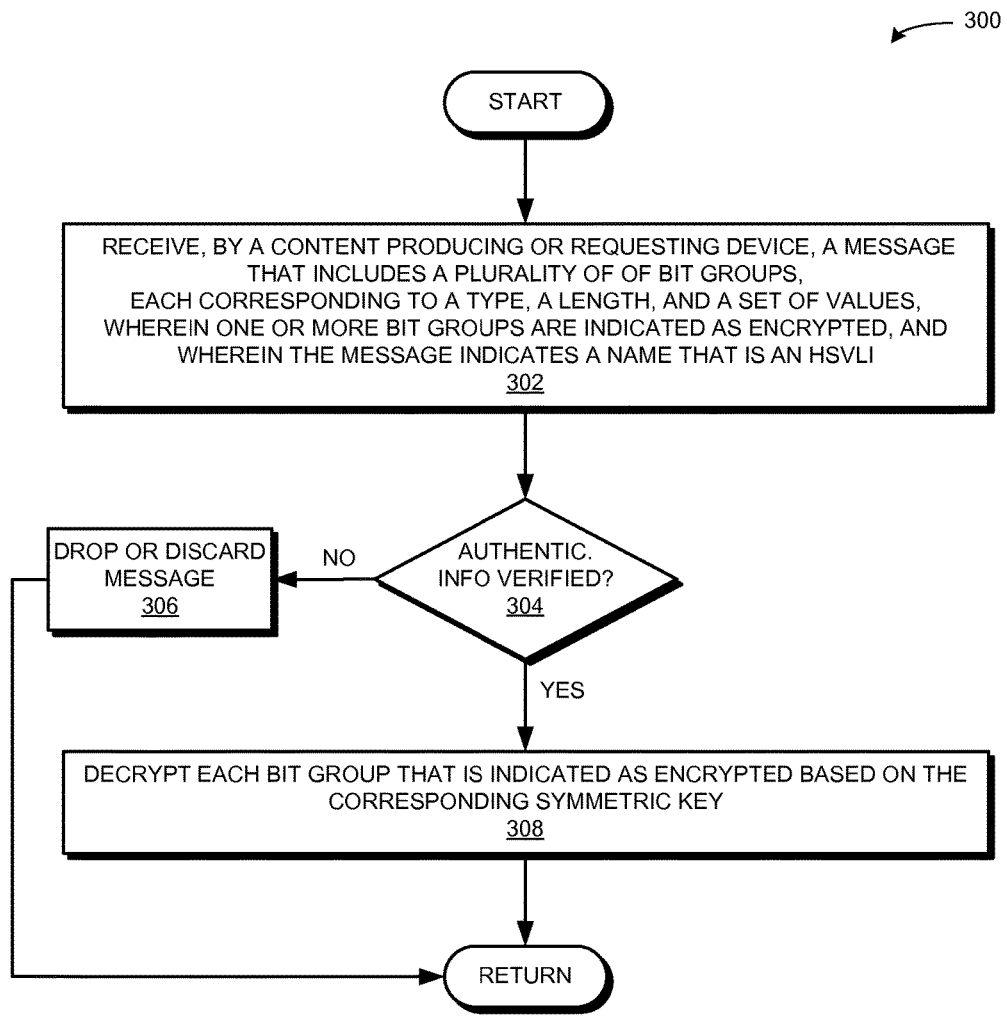
FIG. 3 presents a flow chart illustrating a method by a content requesting device or a content producing device for verifying and decrypting a selectively encrypted CCN message, in accordance with an embodiment of the present invention.

FIG. 3 presents a flow chart 300 illustrating a method by a content requesting device or a content producing device for verifying and decrypting a selectively encrypted CCN message, in accordance with an embodiment of the present invention. During operation, the system receives, by a content producing device or a content requesting device, a message that includes a plurality of bit groups, each corresponding to a type, a length, and a set of values, wherein one or more bit groups are indicated as encrypted (operation 302). The message also indicates a name that is a hierarchically structured variable-length identifier comprising contiguous name components ordered from a most general level to a most specific level. The system determines whether the authentication information is verified (decision 304). For example, the system can look up in a key storage the key identifier. If the key identifier is found, the system can subsequently verify the authenticator tag(s) (e.g., a CWC-MAC signature) included in the validation section. If the authentication information is not verified, the system drops or discards the message (operation 306) and the operation returns. If the authentication information is verified, the system decrypts each bit group that is indicated as encrypted based on the corresponding symmetric key (operation 308).

Exemplary Format for Selectively Encrypted CCN Messages

Figure 4A:
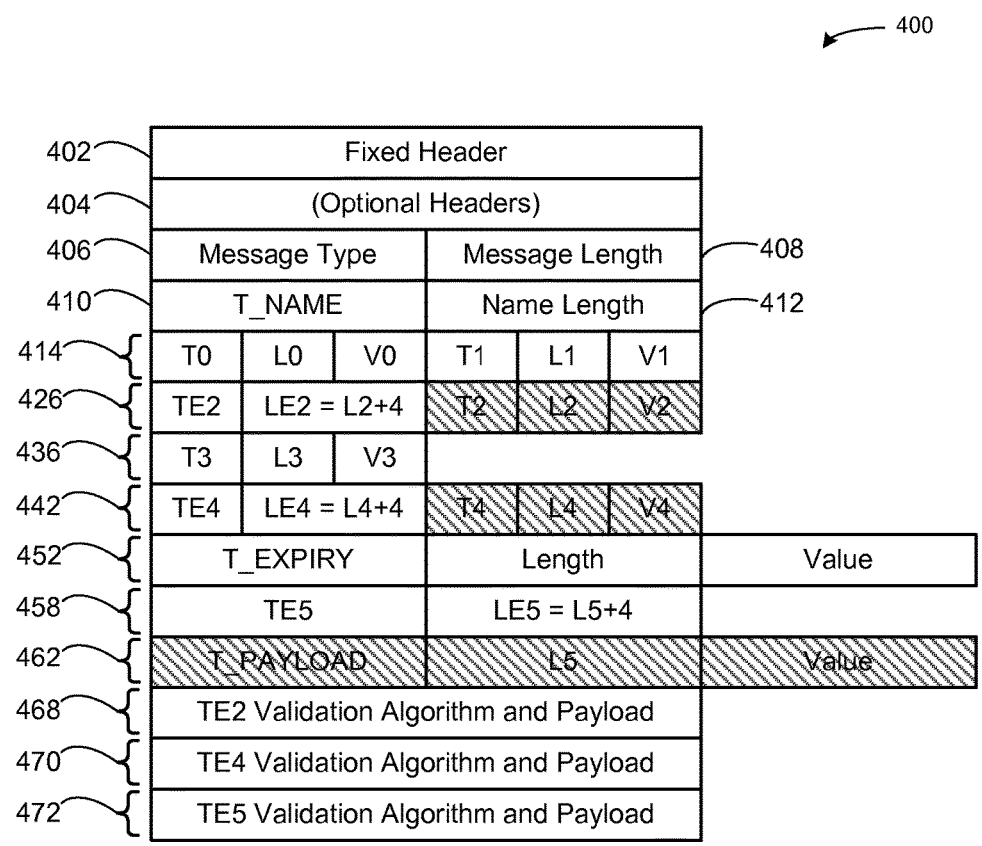
FIG. 4A illustrates an exemplary format for a selectively encrypted CCN message, in accordance with an embodiment of the present invention.

FIG. 4A illustrates an exemplary format for a selectively encrypted CCN message 400, in accordance with an embodiment of the present invention. Message 400 can include a fixed header 402, optional headers 404, a message type 406, a message length 408, and a message value that comprises fields 410 and 412 and the fields shown in lines 414, 426, 436, 442, 452, 458, and 462. Field 410 can be a type field with a value of "T_NAME" and field 412 can be a length field with a value equal to "Name Length." Line 414 can include TLV values for the first and second name components of a name: "T0," "L0," and "V0"; and "T1," "L1," and "V1." Line 426 can include an indicator that the subsequent value or bit group (e.g., the third name component) is an encrypted value based on a specific symmetric key. For example, line 426 can include a type field with a value of "TE2," a length field with a value of "LE2=L2+4" (e.g., the length of the third name component plus four bytes for the corresponding type and length fields, with values of "T2" and "L2," respectively), and a value field that comprises the encrypted version of the bit group for the third name component (e.g., "T2," "L2," and "V2"), as indicated by the patterned background. The TE values may be selected from a range of values, which link to corresponding validation sections for each TE. The authentication range for each TE is over the entire CCN message. Furthermore, each TE indicates a value that is an independent key/nonce execution of the underlying AEAD scheme, e.g., GCM-AES. A validation section for TE2 is included in the message at line 468, as described below.

Line 436 can include TLV values for the fourth name component of a name: "T3," "L3," and "V3." Line 442 can include an indicator that the subsequent value or bit group (e.g., the fifth name component) is an encrypted value. For example, line 442 can include a type field with a value of "TE4," a length field with a value of "LE4=L4+4" (e.g., the length of the fifth name component plus four bytes for the corresponding type and length fields, with values of "T4" and "L4," respectively), and a value field that comprises the encrypted version of the bit group for the fifth name component (e.g., "T4," "L4," and "V4"), as indicated by the patterned background. A validation section for TE4 is included in the message at line 470.

Line 452 includes another TLV bit group that has a type of "T_EXPIRY" and a corresponding length and value. Line 458 can include an indicator that the subsequent value or bit group (e.g., the payload of the message) is an encrypted value. For example, line 458 can include a type field with a value of "TE5," a length field with a value of "LE5=L5+4" (e.g., the length of the payload component plus four bytes for the corresponding type and length fields, with values of "T_PAYLOAD" and "L5," respectively), and a value field that comprises the encrypted version of the bit group for the payload (e.g., "T_PAYLOAD," "L5," and "Value"), as indicated by the patterned background.

Message 400 can also include a validation section that corresponds to each encryption scheme used in message 400. The validation sections can be included linearly, or, in the case of nested encryption, based on a post-order traversal. Message 400 can include a line 468 that indicates the validation algorithm and validation payload corresponding to the encryption marked by "TE2" at line 426. Message 400 can also include lines 470 and 472, which indicate the validation algorithm and validation payload corresponding to the encryption marked, respectively, by "TE4" at line 442 and by "TE5" at line 458. An exemplary format of a validation section is described below in relation to FIG. 5.

Given an original name such as "/a/b/c/d/e" for an interest, the selectively encrypted version of the name based on message 400 may be "/a/b/$E_{K2}$\{c\}/d/$E_{K4}$\{e\}," where K2 is indicated as the symmetric key used to encrypt the third name component, "c," and K4 is indicated as the symmetric key used to encrypt the fifth name component, "e."

Figure 4B:
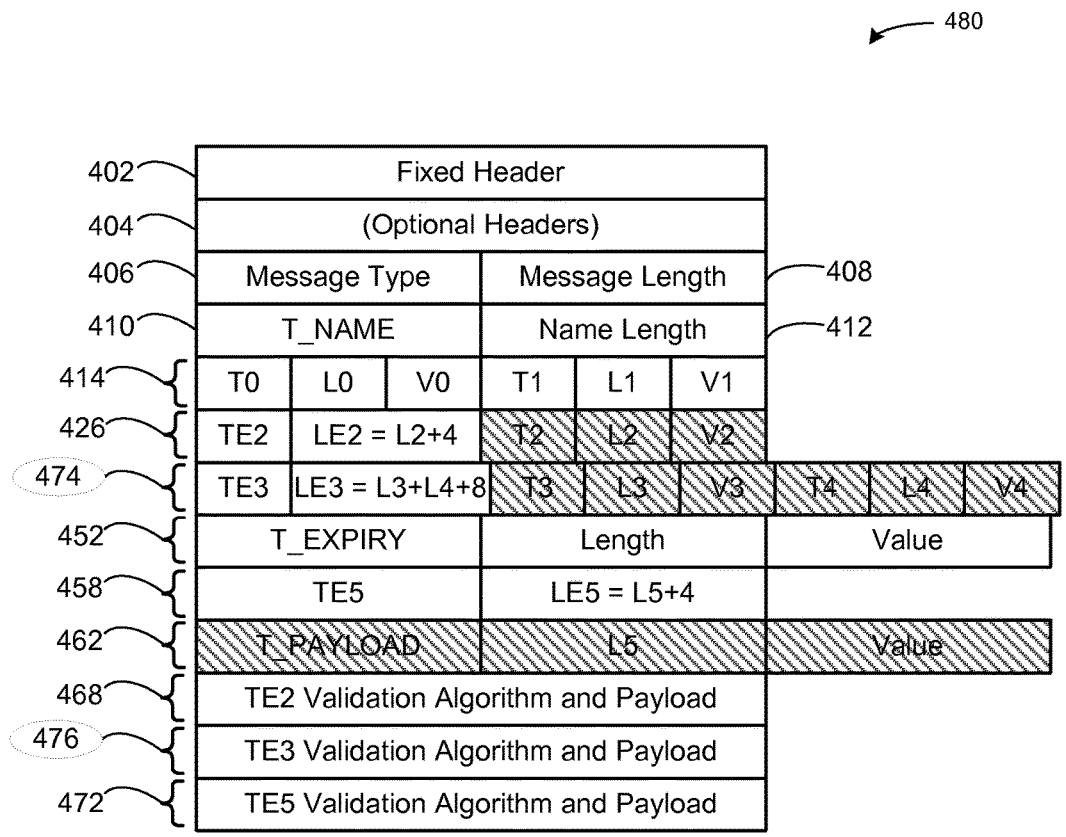
FIG. 4B illustrates an exemplary format for a selectively encrypted CCN message, in accordance with an embodiment of the present invention.

FIG. 4B illustrates an exemplary format for a selectively encrypted CCN message 480, in accordance with an embodiment of the present invention. Message 480 can include similar fields as message 400 of FIG. 4A (different fields are marked with a dotted circle around the corresponding label), including fixed header 402, optional headers 404, message type 406, message length 408, and a message value that comprises fields 410 and 412 and the fields shown in lines 414, 426, 474, 452, 458, and 462. Lines 414 and 426 include similar information as in FIG. 4A for the first, second, and third name components. Line 474 can include an indicator that the subsequent value or bit group (e.g., the fourth and fifth name components) is an encrypted value. For example, line 474 can include a type field with a value of "TE3," a length field with a value of "LE3=L3+L4+8" (e.g., the length of the fourth name component plus the length of the fifth name component plus eight bytes for the respective corresponding type and length fields, with values of "T3," "L3," "T4," and "L4," respectively), and a value field that comprises the encrypted version of the bit group for the fourth and fifth name components (e.g.: "T3," "L3," and "V3"; and "T4," "L4," and "V4"), as indicated by the patterned background. Lines 452, 458, 462, 468, and 472 of message 480 include similar information as described in relation to message 400 of FIG. 4A. Message 480 does include a line 476 that indicates the validation algorithm and validation payload corresponding to the encryption marked by "TE3 in message 480 at line 474.

Given an original name such as "/a/b/c/d/e" for an interest, the selectively encrypted version of the name based on message 480 may be "/a/b/$E_{K2}$\{c\}/$E_{K3}$\{/d/e\}," where K2 is indicated as the symmetric key used to encrypt the third name component, "c," and K3 is indicated as the symmetric key used to encrypt the fourth and fifth name components, "/d/e".

Figure 4C:
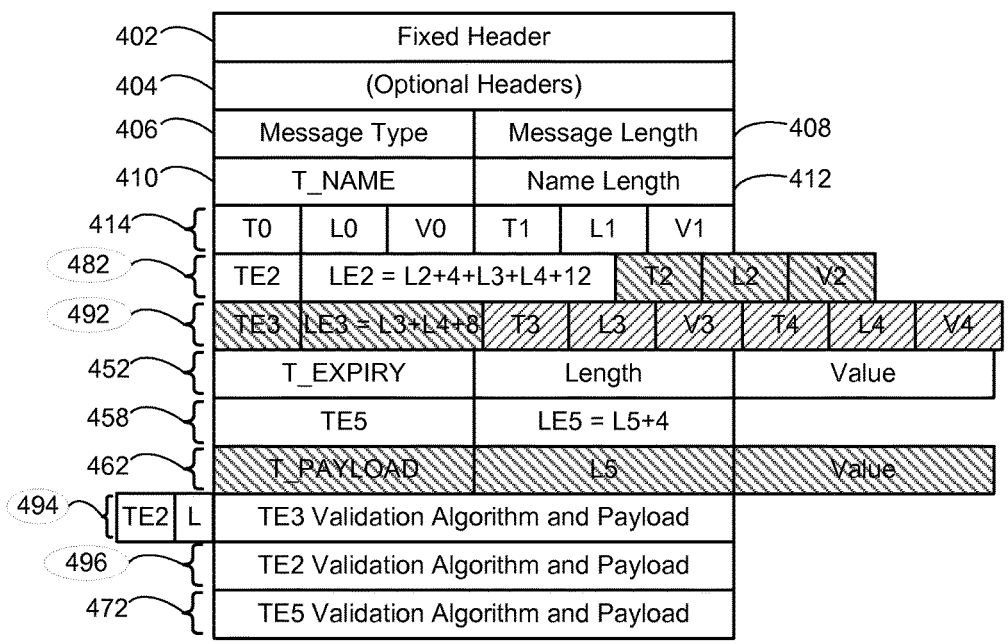
FIG. 4C illustrates an exemplary format for a selectively encrypted CCN message with nested encryption, in accordance with an embodiment of the present invention.

FIG. 4C illustrates an exemplary format for a selectively encrypted CCN message 490 with nested encryption, in accordance with an embodiment of the present invention. Message 490 can include similar fields as message 400 of FIG. 4A, including fixed header 402, optional headers 404, message type 406, message length 408, and a message value that comprises fields 410 and 412 and the fields shown in lines 414, 482, 492, 452, 458, and 462. Line 414 includes similar information as in FIG. 4A for the first and second name components.

Line 482 can include an indicator that the subsequent value or bit group (e.g., the third name component, and then, in a nested encryption, the fourth and fifth name components) is an encrypted value. For example, line 482 can include a type field with a value of "TE2" and a length field with a value of "LE2=L2+4+L3+L4+12." "LE2" is calculated based on the length of the third name component plus four bytes for the corresponding type and length fields (with values of "T2" and "L2"), plus the length of the fourth and fifth name components plus 12 bytes for the respective corresponding type and length fields (with values of "TE3," LE3," "T3," "L3," "T4," and "L4," respectively). Line 482 can also include a value field that comprises both the encrypted version of the bit group for the third name component (e.g., "T2," "L2," and "V2"), as indicated by the patterned background, and the nested encryption depicted in line 492. Line 492 indicates a nested encryption that is included in the TE2 container of line 482. Line 492 can include a type field with a value of "TE3" and a length field with a value of "LE3=L3+L4+8." "LE3" is calculated based on the length of the fourth and fifth name components plus eight bytes for the corresponding type and length fields (with values of "T3," "L3," "T4," and "L4," respectively). Line 492 can also include a value field that comprises the encrypted version of the bit group for the fourth and fifth name components (e.g., "T3," "L3," "V3," "T4," "L4," and "V4"), as indicated by the patterned background.

Lines 452, 458, 462, and 472 of message 490 include similar information as described in relation to message 400 of FIG. 4A. The validation sections included in message 490 are slightly different based on the nested encryption of the TE3 values (fourth and fifth name components) within the TE2 encryption container. In general, an encryptor includes a validation section for each encrypted context or container. For a nested encryption, the validation section corresponding to the nested encryption must also be encrypted under the same parent container. For example, TE3 is a nested encryption under TE2, so the validation section corresponding to TE3 is also encrypted under TE2. Message 480 includes a line 494 which depicts this scenario. Line 494 includes an indicator that the subsequent value (e.g., the TE3 validation section) is an encrypted value. Line 494 can include a type field with a value of "TE2" and a length field for a value of "L" that corresponds to the length of the validation section for TE3. Line 496 indicates the validation algorithm and validation payload corresponding to the encryption marked by "TE2," and line 472 indicates the validation algorithm and validation payload corresponding to the encryption marked by "TE5."

Given an original name such as "/a/b/c/d/e" for an interest, the selectively encrypted version of the name based on message 490 may be "/a/b/$E_{K2}$\{c, $E_{K3}$\{/d/e\} \}," where K2 is indicated as the symmetric key used to encrypt the third name component, "c," and the (nested) encrypted version of the fourth and fifth name components, and K3 is indicated as the symmetric key used to encrypt the fourth and fifth name components, "/d/e".

Figure 4D:
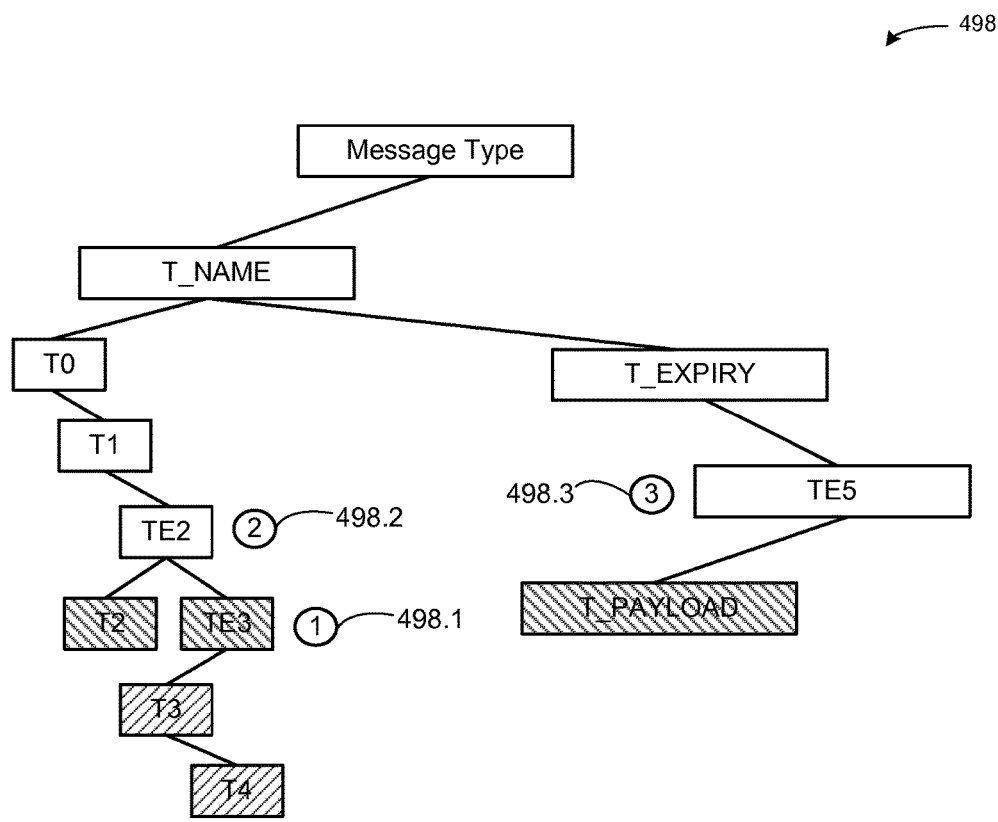
FIG. 4D illustrates an exemplary format for an encoding graph with a post-order traversal, corresponding to the exemplary format for the message in FIG. 4C, in accordance with an embodiment of the present invention.

FIG. 4D illustrates an exemplary format for an encoding graph 498 with a post-order traversal, corresponding to the exemplary format for message 490 in FIG. 4C, in accordance with an embodiment of the present invention. Graph 498 depicts containment of bit groups as left nodes and sequential ordering of bit groups as right nodes. Functions 498.1, 498.2, and 498.3 correspond to a depth-first search post-order for encrypting the bit groups in their respective containers. For example, function 498.1 is the first function performed and corresponds to the inner TE3 container for encrypting the T3 and T4 name components (marked with a "1" in a circle). Based on the post-order traversal, the next function is function 498.2, which corresponds to the TE2 container for encrypting the T2 bit group and the encrypted T3 container (marked with a "2" in a circle). Finally, the third function is function 498.3, which corresponds to the TE5 container for encrypting the payload (marked with a "3" in a circle). In some embodiments, without nested encryption, the traversal can be performed linearly or based on an ascending TE value.

Figure 4E:
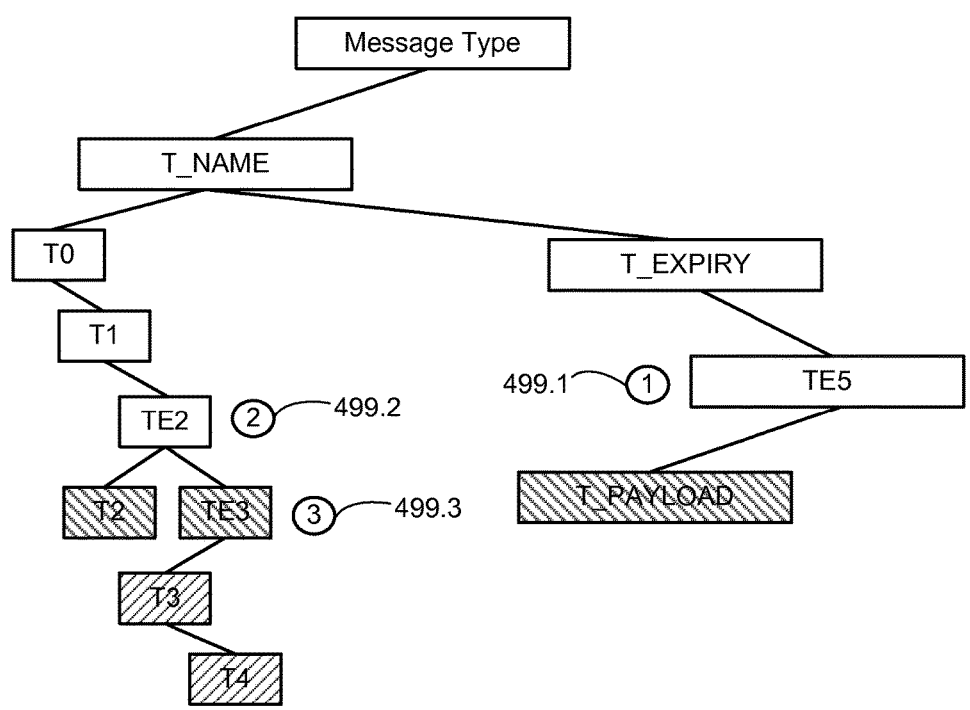
FIG. 4E illustrates an exemplary format for an encoding graph with a reverse post-order traversal, corresponding to the exemplary format for the message in FIG. 4C, in accordance with an embodiment of the present invention.

FIG. 4E illustrates an exemplary format for an encoding graph 499 with a post-order traversal, corresponding to the exemplary format for message 490 in FIG. 4C, in accordance with an embodiment of the present invention. Similar to graph 498, graph 499 depicts containment of bit groups as left nodes and sequential ordering of bit groups as right nodes. Functions 499.1, 499.2, and 499.3 correspond to a depth-first search reverse post-order for decrypting the bit groups in their respective containers. For example, the first function performed is function 499.1, which corresponds to the TE5 container for decrypting the payload (marked with a "1" in a circle). Based on the post-order traversal, the next function is function 499.2, which corresponds to the TE2 container for decrypting the T2 bit group and the encrypted T3 container (marked with a "2" in a circle). Finally, function 499.3 is the third function and corresponds to the inner TE3 container for decrypting the T3 and T4 name components (marked with a "3" in a circle). Note that decryption is performed in the reverse order of the validation sections listed in the packet. Thus, functions 499.1-499.3 are performed in a reverse post-order which corresponds to the reverse order of the validation sections listed in FIG. 4C.

Exemplary Format for Validation Section of Selectively Encrypted CCN Messages

FIG. 5 illustrates an exemplary format for a validation section 500 of a selectively encrypted CCN message, in accordance with an embodiment of the present invention. Validation section 500 can include a validation algorithm (lines 502, 506, 512, and 518) and a validation payload (lines 524 and 528). The validation algorithm section can include a nonce and a KeyId for each symmetric key used to encrypt a bit group. For example, line 502 can include a type field with a value of "T_VALALG" and a length field whose value includes the length of the fields shown in lines 506, 512, and 518. Line 506 is a TLV bit group for the KeyId and includes: a type field with a value of "T_KEYID"; a length field; and a value field of "KeyID." Line 512 is a TLV bit group for the nonce and includes: a type field with a value of "T_NONCE"; a length field with a value of 1-8 bytes; and a value field of "Nonce(IV)." As described above, the KeyId identifies a (key, salt) pair which is created during association setup, while the nonce is 1-8 bytes in size and left-padded with 0's to 8 bytes and appended to the salt to form the GCM-AES IV.

Line 518 is a TLV bit group for the container, which is a range of encrypted container values that allows matching of keys to containers. For example, line 518 can include a type field with a value of "T_CONTAINER," a length field with a value of "2," and a value field that is the "TE Value" (e.g., TE2 of message 400 in FIG. 4A).

Line 524 includes a type field with a value of "T_PAYLOAD" and a length field with a value of 8, 12, or 16 bytes (as described in RFC 4106), and line 528 includes a value field that comprises an authenticator tag which is created based on the underlying AEAD scheme. For example, using AES-GCM as described above, the authenticator tag is created based on a GHASH function performed over all of the encrypted and non-encrypted data for each encrypted container.

Wrapping Solution/Method

In addition to the selective encryption of a CCN message described herein, a CCN message may also be encrypted based on a wrapping method. This method involves encapsulating an interest packet or a content object packet with a routable encapsulation name and various "wrapper" headers. To create a "wrapper" interest of an original interest, an entity creates a T_ENCAP packet, assigns an encapsulation or "wrapper" name to the wrapper interest, and places the original interest in an encrypted container after the name. The entity adds a validation section (e.g., ValidationAlg and ValidationPayload), where the ValidationAlg identifies that this specific scheme is being used and is 0-bytes of value.

To create a "wrapper" content object of an original content object, an entity creates a T_ENCAP packet, assigns the same wrapper interest name to the wrapper content object, and places the original content object in an encrypted container. The encrypted container for the original content object typically has a different TE number or encryption container indicator than the encrypted or wrapped interest. For example, if a consumer wraps the original interest in a container based on a symmetric key K1, it is likely that a responding producer wraps the responsive content object in a container based on a different symmetric key K2. Note that the consumer and the producer both possess the secret symmetric keys K1 and K2 via a key exchange protocol. Similar to wrapping the original interest, the entity that wraps the original content object adds a validation section, which includes a ValidationAlg with the (KeyID, Nonce) pair used by the encrypted container, and further includes a ValidationPayload with the authenticator tag. If there is only one encrypted container (e.g., only one TE or encrypted container), the encryptor does not need to include the TE number in the validation section. Plaintext cache control directives (or other TLVs) may be included in the T_ENCAP packet outside of the encrypted interest or content object packet.

Exemplary Apparatus and Computer System

Figure 6:
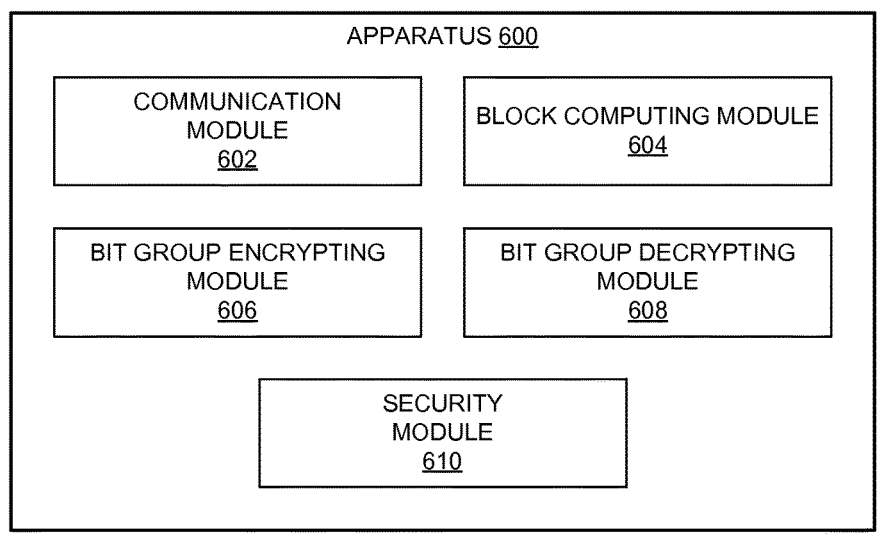
FIG. 6 illustrates an exemplary apparatus that facilitates selective encryption of bit groups of a CCN message, in accordance with an embodiment of the present invention.

FIG. 6 illustrates an exemplary apparatus 600 that facilitates selective encryption of bit groups of a CCN message, in accordance with an embodiment of the present invention. Apparatus 600 can comprise a plurality of modules which may communicate with one another via a wired or wireless communication channel. Apparatus 600 may be realized using one or more integrated circuits, and may include fewer or more modules than those shown in FIG. 6. Further, apparatus 600 may be integrated in a computer system, or realized as a separate device which is capable of communicating with other computer systems and/or devices. Specifically, apparatus 600 can comprise a communication module 602, a block computing module 604, a bit group encrypting module 606, a bit group decrypting module 608, and a security module 610.

In some embodiments, communication module 602 can send and/or receive data packets to/from other network nodes across a computer network, such as a content centric network, where a data packet can correspond to an interest or a content object message that includes a plurality of bit groups, each corresponding to a type, a length, and a set of values, wherein one or more bit groups are marked for encryption. Block computing module 604 can compute a plurality of cipher blocks for the message based on an authenticated encryption protocol. Bit group encrypting module 606 can encrypt the one or more bit groups marked for encryption based on one or more symmetric keys, wherein the marked bit groups include one or more name components. Bit group encrypting module 606 can also indicate the encrypted bit groups as encrypted.

Communication module 602 can transmit the selectively encrypted message to a content producing device or a content requesting device. Bit group encrypting module 606 can indicate the encrypted bit groups as encrypted by setting a field associated with the bit group in the message or by setting a reserved bit associated with the bit group in the message.

Security module 610 can include in a validation section for the message a nonce and a key identifier for each of the symmetric keys. Security module 610 can also include one of the following: wherein a symmetric key is exchanged via a public key operation; wherein a symmetric key is encrypted based on a public key included in the message; wherein the validation section is based on a symmetric key cryptographic system with encryption; wherein a public key identifier of the content producing device is included in the message; and wherein a short symmetric key identifier is specified for use in subsequent messages between the content requesting device and the content producing device. Security module 610 can verify the authentication information associated with the message by: looking up in a storage a key identifier associated with the message; and verifying a signature or a message authentication code based on the key identifier.

Communication module 602 can receive the selectively encrypted message. In response to verifying authentication information associated with the message (security module 610), bit group decrypting module 608 can decrypt, for each bit group indicated as encrypted, the encrypted bit group based on a corresponding symmetric key, wherein a nonce and a key identifier for each of the symmetric keys are included in a validation section for the message. Bit group decrypting module 608 can indicate the decrypted bit groups as decrypted.

Figure 7:
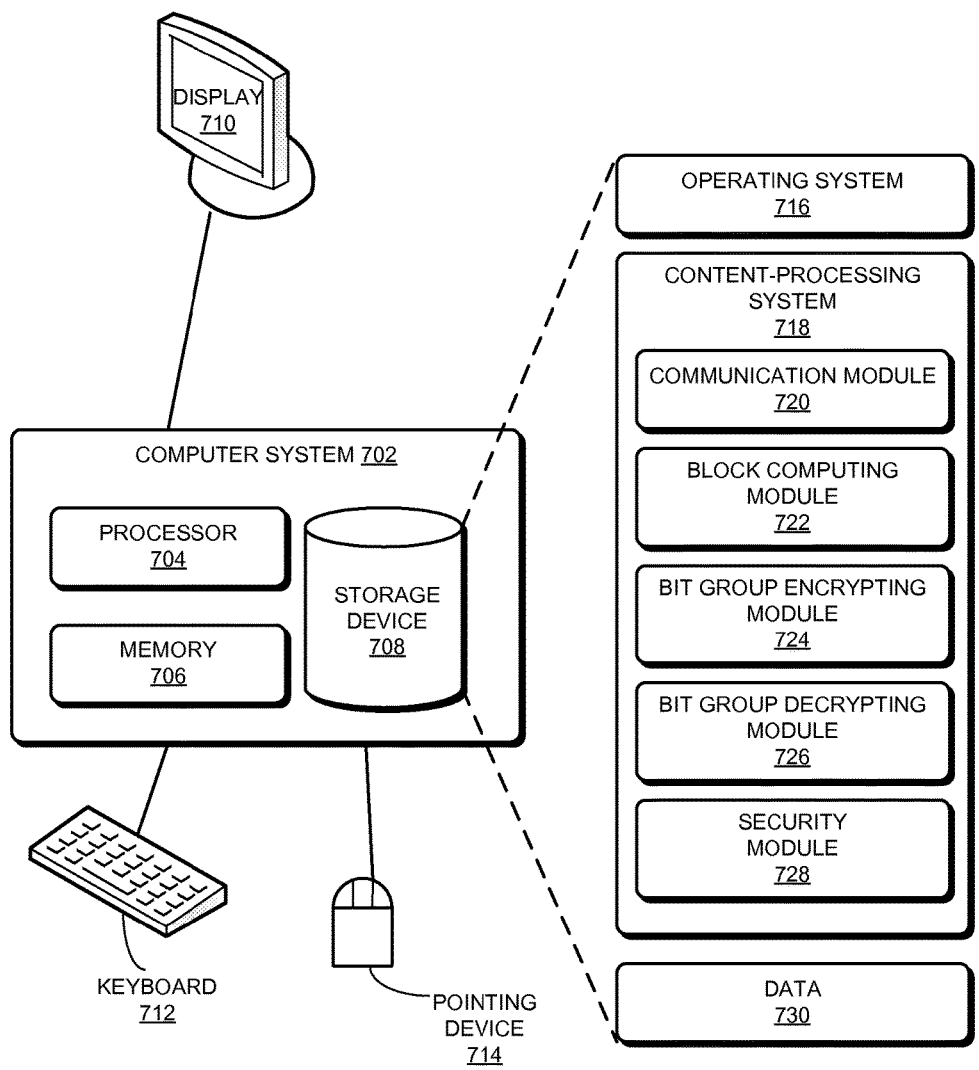
FIG. 7 illustrates an exemplary computer system that facilitates selective encryption of bit groups of a CCN message, in accordance with an embodiment of the present invention.

FIG. 7 illustrates an exemplary computer system 702 that facilitates selective encryption of bit groups of a CCN message, in accordance with an embodiment of the present invention. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store an operating system 716, a content-processing system 718, and data 730.

Content-processing system 718 can include instructions, which when executed by computer system 702, can cause computer system 702 to perform methods and/or processes described in this disclosure. Specifically, content-processing system 718 may include instructions for sending and/or receiving data packets to/from other network nodes across a computer network, such as a content centric network, where a data packet can correspond to an interest or a content object message that includes a plurality of bit groups, each corresponding to a type, a length, and a set of values, wherein one or more bit groups are marked for encryption. Content-processing system 718 can include instructions for computing a plurality of cipher blocks for the message based on an authenticated encryption protocol (block computing module 722). Content-processing system 718 can also include instructions for encrypting the one or more bit groups marked for encryption based on one or more symmetric keys and for indicating the encrypted bit groups as encrypted (bit group encrypting module 724).

Content-processing system 718 can further include instructions for transmitting the selectively encrypted message to a content producing device or a content requesting device (communication module 720). Content-processing system 718 can include instructions for indicating the encrypted bit groups as encrypted by setting a field associated with the bit group in the message or by setting a reserved bit associated with the bit group in the message (bit group encrypting module 724).

Content-processing system 718 can additionally include instructions for including in a validation section for the message a nonce and a key identifier for each of the symmetric keys (security module 728). Content-processing system 718 can include instructions for including one or more of the following: wherein a symmetric key is exchanged via a public key operation; wherein a symmetric key is encrypted based on a public key included in the message; wherein the validation section is based on a symmetric key cryptographic system with encryption; wherein a public key identifier of the content producing device is included in the message; and wherein a short symmetric key identifier is specified for use in subsequent messages between the content requesting device and the content producing device (security module 728). Content-processing system 718 can also include instructions for verifying the authentication information associated with the message by: looking up in a storage a key identifier associated with the message; and verifying a signature or a message authentication code based on the key identifier (security module 728).

Content-processing system 718 can also include instructions for receiving the selectively encrypted message (communication module 720). Content-processing system 718 can include instructions for, in response to verifying authentication information associated with the message (security module 728), decrypting, for each bit group indicated as encrypted, the encrypted bit group based on a corresponding symmetric key, wherein a nonce and a key identifier for each of the symmetric keys are included in a validation section for the message (bit group decrypting module 726). Content-processing system 718 can include instructions for indicating the decrypted bit groups as decrypted (bit group decrypting module 726).

Data 830 can include any data that is required as input or that is generated as output by the methods and/or processes described in this disclosure. Specifically, data 830 can store at least: a packet or message that corresponds to an interest or a content object; a bit group that corresponds to a type, a length, and a set of values; a name that is a hierarchically structured variable-length identifier (HSVLI) comprising contiguous name components ordered from a most general level to a most specific level; a message that includes a plurality of bit groups, wherein one or more bit groups are marked for encryption, and wherein the message indicates a name that is an HSVLI; a plurality of cipher blocks; an indicator of an authenticated encryption protocol; one or more symmetric keys; a key identifier or a KeyId; a nonce; a key, salt pair; Initialization Vectors; plaintext; ciphertext; associated data; an authentication tag or an authenticator; a GHASH function; an indicator of an encrypted bit group or a decrypted bit group; a field or a reserved bit associated with a bit group; an indicator of a public key operation; a public key; an indicator of a symmetric key cryptographic system with encryption; a public key identifier or a public KeyId; a short symmetric key identifier; a key storage; and a signature or a message authentication code.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A system comprising:
   a content requesting device configured to communicate with a content centric network (CCN) and to perform a method comprising:
   generating an Interest requesting a content object by a hierarchically structured variable-length name that is used to forward the Interest in the CCN, the name comprising name components arranged contiguously in an order from a most general level to a most specific level and each including a bit group comprising a type, a length, and a set of values, wherein one or more of the name components at the most specific level are marked for encryption;
   exchanging one or more symmetric keys via a public key operation;
   encrypting each name component at the most specific level marked for encryption using a respective symmetric key, to produce a selectively encrypted name having one or more encrypted name components and one or more unencrypted name components;
   indicating each encrypted name component as encrypted by setting a respective field associated with the bit group of the encrypted name component;
   including in the Interest a validation section that identifies the respective symmetric key for each encrypted name component; and
   transmitting the Interest to the CCN; and
   a content producing device configured to receive the Interest from the CCN and responsive thereto, perform a method comprising:
   verifying authentication information associated with the Interest by looking up in a storage a key identifier associated with the Interest;
   responsive to the verifying, decrypting, for each encrypted name component indicated as encrypted, the encrypted name component based on a corresponding symmetric key, wherein a nonce and a key identifier for each of the symmetric keys are included in a validation section for the Interest;
   indicating the decrypted name components as decrypted; and
   producing a content object that matches the name components as decrypted.

2. The system of claim 1, wherein the method further comprises:
encrypting the content object using one of the symmetric keys.

3. The system of claim 1, wherein the encrypting includes computing a plurality of cipher blocks for the Interest based on an authenticated encryption protocol.

4. The system of claim 3, wherein computing the cipher blocks is further based on beginning at byte zero of the Interest.

5. The system of claim 3, wherein computing the cipher blocks is further based on an Advanced Encryption Standard using a key with a length of 128 bits.

6. The system of claim 1, wherein encrypting the bit groups of the name components marked for encryption is further based on an exclusive disjunction operation.

7. The system of claim 1, wherein indicating each encrypted name component further comprises:
setting a reserved bit associated with the bit group of the encrypted name component.

8. The system of claim 1, further comprising one or more of the following:
wherein a symmetric key is encrypted based on a public key included in the Interest;
wherein the validation section is based on a symmetric key cryptographic system with encryption;
wherein a public key identifier of the content requesting device is included in the Interest; and
wherein a symmetric key identifier is specified for use in subsequent messages between the content requesting device and the content producing device.

9. The system of claim 8, further comprising one or more of the following:
wherein the public key operation is based on a cryptographic system that is Rivest-Shamir-Adleman Secure Hash Algorithm 256-bit (RSA-SHA 256); and
wherein the symmetric key identifier is a random number that is not derived from the symmetric key.

10. The system of claim 1, wherein the Interest is configured to be forwarded to the content producing device by CCN nodes along a path of the CCN based on the name.

11. The system of claim 10, wherein the content object packet is configured to be forwarded to the content requesting device along a path of the CCN in reverse to the Interest based on the name.

12. A computer-implemented method comprising:
at a content producing device configured to communicate with a content centric network (CCN):
generating a content object packet responsive to an Interest from a content requesting device that requests a content object by a hierarchically structured variable-length name, the content object packet including the content object and the name to be used to forward the content object packet in the CCN, the name comprising name components arranged contiguously in an order from a most general level to a most specific level and each including a bit group comprising a type, a length, and a set of values, wherein one or more of the name components are marked for encryption;
exchanging one or more symmetric keys via a public key operation;
encrypting each name component at the most specific level marked for encryption using a respective symmetric key, to produce a selectively encrypted name having one or more encrypted name components and one or more unencrypted name components;
indicating each encrypted name component as encrypted by setting a respective field associated with the bit group of the encrypted name component;
including in the content object packet a validation section that identifies the respective symmetric key for each encrypted name component; and
transmitting the content object packet to the CCN; and
at the content requesting device, receiving the content object packet from the CCN, and responsive thereto:
verifying authentication information associated with the content object packet by looking up in a storage a key identifier associated with the content object packet, and verifying a signature or a message authentication code based on the key identifier;
responsive to the verifying, decrypting, for each encrypted name component indicated as encrypted, the encrypted name component based on a corresponding symmetric key, wherein a nonce and a key identifier for each of the symmetric keys are included in the validation section for the content object packet;
indicating the decrypted name components as decrypted; and
based on the decrypted name components, performing a lookup, and clearing an entry, in a Pending Interest Table (PIT) corresponding to the Interest.

13. The method of claim 12, wherein the method further comprises:
encrypting the content object of the content object packet using one of the symmetric keys; and
storing in the validation section an identifier of the one of the symmetric keys used to encrypt the content object.

14. The method of claim 12, wherein indicating each encrypted name component further comprises:
setting a reserved bit associated with the bit group of the encrypted name component.

15. The method of claim 12, further comprising one or more of the following:
wherein the validation section is based on a symmetric key cryptographic system with encryption;
wherein a public key identifier of the content producing device is included in the content object packet; and
wherein a symmetric key identifier is specified for use in subsequent messages between the content requesting device and the content producing device.

16. The method of claim 15, further comprising one or more of the following:
wherein the public key operation is based on a cryptographic system that is Rivest-Shamir-Adleman Secure Hash Algorithm 256-bit (RSA-SHA 256); and
wherein the symmetric key identifier is a random number that is not derived from the symmetric key.

17. The method of claim 12, wherein the content object packet is configured to be forwarded to the content requesting device along a path of the CCN in reverse to the Interest based on the name.

18. The method of claim 12, wherein the encrypting includes computing a plurality of cipher blocks for the content object packet based on an authenticated encryption protocol.

19. The system of claim 1, wherein the encrypting includes first encrypting the one or more of the name components marked for encryption using a first symmetric key and second encrypting results of the first encrypting using a second symmetric key to produce one or more nested encryption name components.

20. The system of claim 19, further comprising:
encrypting the second symmetric key and storing the results in the validation section in correspondence with the one or more nested encryption name components.

21. The system of claim 1, wherein the Interest is configured to be forwarded to the content producing device by CCN nodes along a path of the CCN based on the name, and the content object packet is configured to be forwarded to the content requesting device along a path of the CCN in reverse to the Interest based on the name.

22. The method of claim 1, wherein the encrypting each name component at the most specific level includes encrypting at least two name components at the most specific level with at least two respective symmetric keys.

23. The method of claim 12, wherein the encrypting each name component at the most specific level includes encrypting at least two name components at the most specific level with at least two respective symmetric keys.

24. The method of claim 12, further comprising, at the content requesting device, when the authentication information is not verified, discarding the content object.

* * * * *